United States Patent [19]

Davies

[11] Patent Number: 5,450,604

[45] Date of Patent: Sep. 12, 1995

[54] DATA ROTATION USING PARALLEL TO SERIAL UNITS THAT RECEIVE DATA FROM MEMORY UNITS AND ROTATION BUFFER THAT PROVIDES ROTATED DATA TO MEMORY UNITS

[75] Inventor: Daniel Davies, Palo Alto, Calif.

[73] Assignee: Xerox Corporation, Stamford, Conn.

[21] Appl. No.: 994,490

[22] Filed: Dec. 18, 1992

[51] Int. Cl.$^6$ .......................... G06F 7/00; G06F 13/00
[52] U.S. Cl. .................................. 395/800; 364/238.6;
364/238.7; 364/238.8; 364/239.2; 364/240.1;
364/926.3; 364/926.4; 364/926.5; 364/926.5;
364/926.9; 364/927.92; 364/927.93;
364/927.97; 364/939.5; 364/947.6; 364/DIG.
2; 395/427
[58] Field of Search ............... 395/800, 425, 775, 325;
358/22, 160; 364/DIG. 1, DIG. 2

[56] References Cited

U.S. PATENT DOCUMENTS

| | | | |
|---|---|---|---|
| 4,052,699 | 10/1977 | Micka et al. | 340/146.3 MA |
| 4,122,534 | 10/1978 | Cesaratto | 364/900 |
| 4,168,488 | 9/1979 | Evans | 340/146.3 H |
| 4,271,476 | 6/1981 | Lotspiech | 364/515 |
| 4,314,349 | 2/1982 | Batcher | 364/716 |
| 4,437,166 | 3/1984 | O'Brien | 364/900 |
| 4,627,020 | 12/1986 | Anderson et al. | 364/900 |
| 4,636,783 | 1/1987 | Omachi | 340/727 |
| 4,658,430 | 4/1987 | Anderson et al. | 382/46 |
| 4,663,735 | 8/1987 | Novak et al. | 345/190 |
| 4,806,920 | 2/1989 | Sawada | 340/727 |
| 4,837,845 | 6/1989 | Pruett et al. | 382/46 |
| 4,914,622 | 4/1990 | Sfarti et al. | 364/900 |
| 4,916,746 | 4/1990 | Yeschik | 382/46 |
| 4,984,189 | 1/1991 | Neki | 364/900 |
| 5,111,192 | 5/1992 | Kadakia | 340/727 |
| 5,124,692 | 6/1992 | Sasson | 340/727 |
| 5,129,092 | 7/1992 | Wilson | 395/800 |
| 5,173,947 | 12/1992 | Chande et al. | 382/41 |
| 5,179,714 | 1/1993 | Graybill | 395/800 |
| 5,268,856 | 12/1993 | Wilson | 364/748 |
| 5,287,532 | 2/1994 | Hunt | 395/800 |
| 5,365,601 | 11/1994 | Kadakia et al. | 382/46 |
| 5,369,773 | 11/1994 | Hammerstrom | 395/800 |

FOREIGN PATENT DOCUMENTS 0293700 12/1988 European Pat. Off. .
0293701 12/1988 European Pat. Off. .

OTHER PUBLICATIONS

Kornfeld, "The Image Prism: A Device for Rotating and Mirroring Bitmap Images"IEEE Computer Graphics and Application Journal, pp. 21–30, May 1987, (Kornfeld).

Advanced Micro Devices, "Am95C76 Orthogonal Rotation Processor"Preliminary Date Sheet, Publication #09332, Rev. B. Sep. 1987, (Am95C76).

Konnerth et al., "Realtime Rotation and Mirror Transformation of Square Images", IBM Technical Disclosure Bulletin vol. 27, No. 1B, Jun. 1984, pp. 831–834, (Konnerth et al.).

Cooperman M. et al., "Time Division Multliplexing with Orthogonal RAMS"IEEE Transaction on Circuit and Systems, Apr. 1988.

Primary Examiner—Alyssa H. Bowler
Assistant Examiner—Meng-Ai An

[57] ABSTRACT

A processor for performing orthogonal rotations. The processor has a plurality of memory units; each memory unit being capable of being a source memory unit having source data, or a destination memory unit having destination data; and rotation circuitry for performing rotations by orthogonally transforming the source data into the destination data. The rotation circuitry has a plurality of parallel to serial units which provide a serial output data from parallel input data and a rotation buffer. There is also interconnecting circuitry for interconnecting any of the input connections of the parallel to serial units in the rotation circuitry with any of the data connections of the memory units, and for connecting the output connections of the rotation buffer in the rotation circuitry with any of the data connections of the memory units.

22 Claims, 16 Drawing Sheets

DATA ROTATION USING PARALLEL TO SERIAL UNITS THAT RECEIVE DATA FROM MEMORY UNITS AND ROTATION BUFFER THAT PROVIDES ROTATED DATA TO MEMORY UNITS

BACKGROUND OF THE INVENTION

This invention relates to image processing systems. More particularly, to a one dimensional single instruction multiple data (SIMD) parallel processing system with buffers for performing orthogonal rotations.

Yeschick, U.S. Pat. No. 4,916,746 describes an image processing circuit for rotating a block of data representing a portion of an image. As shown in FIG. 1, there is an image display system having an image memory for holding data representing one or more digital images. Data is read out of the image memory in a specified sequence and is then displayed on a video monitor. The system also includes a microprocessor, which has access to the image memory through a sixteen bit data bus 13. The microprocessor can access the image memory whereby it can write new image data or modify existing image data.

The system of Yeschick also includes a rotation circuit having first-in-first-out (FIFO) memory and a shift register as shown in FIG. 2. In operation, data is initially loaded into the FIFO from data bus 13. Once the data has been loaded into the FIFO, a ROTATE signal is set to a logic high allowing the data in the FIFO to shift around the FIFO and into the shift register causing the data to be rotated. An example of operation is described beginning in column 3 line 49 through column 4 line 60 with reference to FIGS. 4 through 6.

Kornfeld, "The Image Prism: A Device for Rotating and Mirroring Bitmap Images" IEEE Computer Graphics and Application Journal, pages 21-30, May 1987, describes a bitmap graphic hardware component, referred to as the "image prism," which enables eight orthogonal transformations. On page 23, Kornfeld discusses how the eight orthogonal transformations can be implemented either by a combination of a rotate and mirror operation or directly via seven special routines. Table 1 summarizes the combination sequence of mirror and rotate operations for each of the eight transformations.

The image prism is described on page 25 and 26 as a memory matrix measuring m×m, where m is the word size of a raster scan memory system. The matrix can be accessed either by row or by column in m-bit wide vectors. The image prism in essence enables the viewing of image data, stored in raster scan order, as a two dimensional matrix which is accessible by row or column. Pages 26 through 29 describe the direct implementation of orthogonal transformations using the image prism.

SUMMARY OF THE INVENTION

In many image processing applications, images are processed in the orientation used to enter them and these applications often assume a certain image orientation. However, the orientation that the image is inserted into a scanning device is often not within the control of the final user. For instance, the image was scanned in "portrait mode" but the processing application assumes "landscape mode." Therefore, the ability to rotate an image by 90 degrees quickly is advantageous to the image processing system.

In systems performing digital image processing, an image is typically represented as a two dimensional array. Such an array of picture elements or pixels are "raster ordered." Raster ordering is an arrangement whereby the pixel array is divided into scanlines corresponding to rows and the rows are arranged into a two dimensional array. Many image processing techniques can be performed on two dimensional image arrays.

Typical rotation operations are performed in two dimensions where an image is represented by rows and columns of data. To rotate 90 degrees, rows of pixel data are transformed into columns and arranged accordingly. However, when an image is stored in memory, it is not stored as an array but as a raster ordered continuous stream of data. There are special devices available to be used with such memory arrangements that take these streams of data and allow row and column access. However, such devices add cost and complexity to a system. Furthermore, such a device is not useful to a one dimensional processor arrangement.

Image processing systems often take advantage of parallel processing to gain system performance. One type of parallel processing system is based on a SIMD (Single Instruction Multiple Data) technology. architecture. A SIMD parallel processor includes processing units, each able to access its own data in memory. Conventional circuitry to change rows into columns would be cumbersome to use in such an arrangement. A special device to facilitate rotation might be necessary in a typical SIMD processor. The special device adds additional cost and complexity to the hardware of the system. However, with the exemplary SIMD arrangement as will be described below, a set of conventional buffers implemented with standard components can be added to the system, for facilitating orthogonal rotation. Yet, the addition of the buffers adds little cost and complexity to the system. Furthermore, such a system could be implemented with other types of parallel processing architectures including one dimensional processors.

In accordance with the present invention, provided is a processor, comprising: a plurality of memory units; each memory unit having address connections for receiving address signals, data connections for providing and receiving data signals, and select connections for receiving select signals; each memory unit being capable of being a source memory unit having source data, or a destination memory unit having destination data; rotation circuitry for performing rotations by orthogonally transforming the source data into the destination data, the rotation circuitry comprising: a plurality of parallel to serial units; each parallel to serial unit has a plurality of input connections and an output connection, the input connections receive data signals in parallel from any of the memory units, the parallel to serial unit stores the data signals, and provides a serial output data signal on the output connection; a rotation buffer; the rotation buffer has a plurality of input and output connections, each input connection receives the serial output data signal from a respective one of the output connections from the parallel to serial units, the output connections of the rotation buffer provide data to any of the data connections of the memory units; interconnecting circuitry for interconnecting any of the input connections of the parallel to serial units in the rotation circuitry with any of the data connections of the memory units, and for connecting the output connections of the rotation buffer in the rotation circuitry with any of the data connections of the memory units; and control circuitry for providing control signals to the memory units, the rotation circuitry and the interconnecting circuitry; the control circuitry causing the interconnecting circuitry to transfer data between the memory units and the rotation circuitry, the control circuitry further comprising: address circuitry for simultaneously providing common address signals to the address connections of all of the memory units; and selection circuitry for providing the select signals to the memory units, the select signals selects one of the memory units as the source memory unit and one of the memory units as the destination memory unit.

BRIEF DESCRIPTION OF THE DRAWINGS

In the drawings:

FIG. 9b is a schematic block diagram representing another implementation of the circuitry of FIG. 9a;

FIG. 9c is a schematic block diagram representing another implementation of the circuitry of FIG. 9a;

FIG. 9d is a schematic block diagram representing another implementation of the circuitry of FIG. 9a;

DETAILED DESCRIPTION OF THE INVENTION

A. Conceptual Framework

Figure 1:
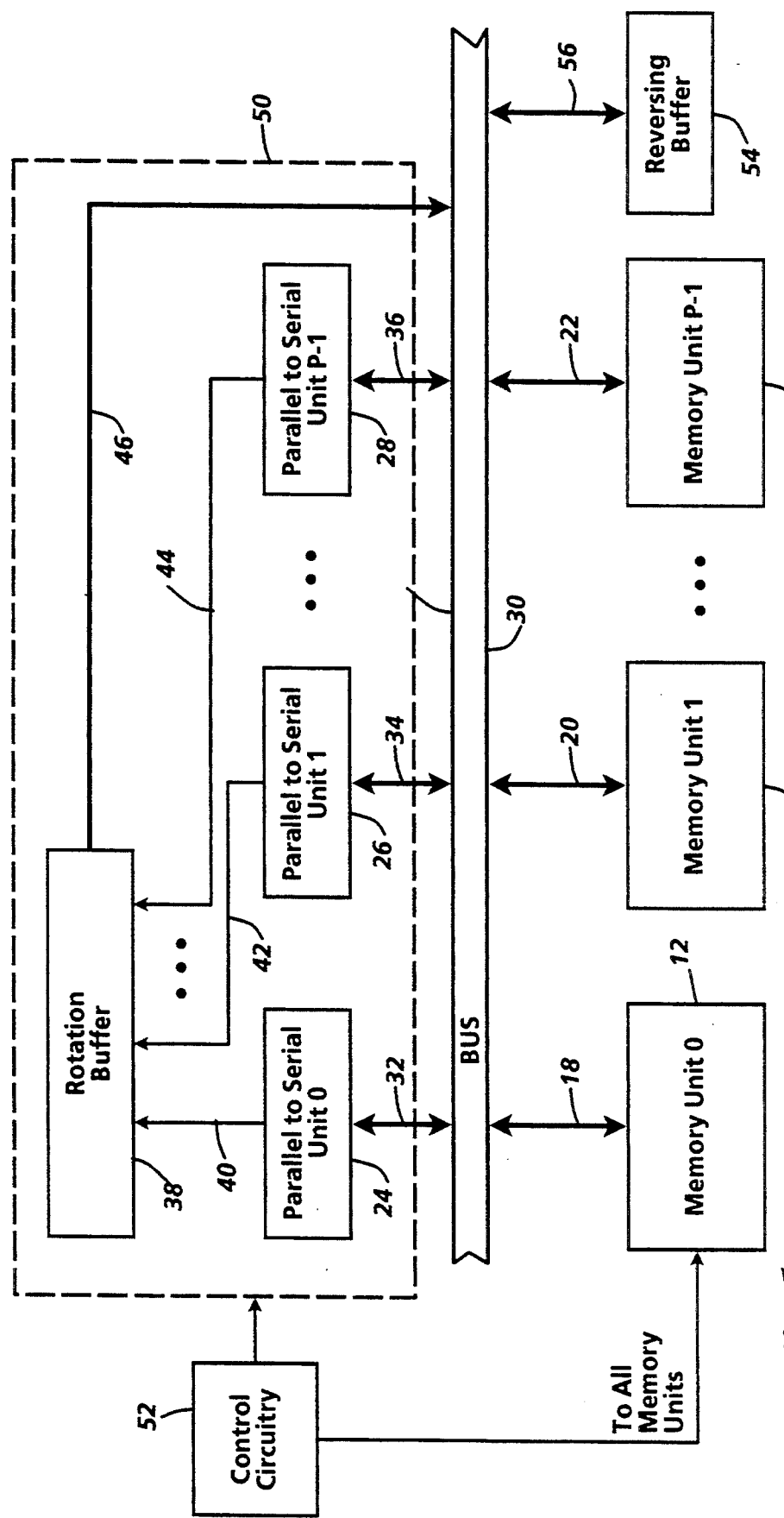
FIG. 1 is a schematic block diagram showing components of a parallel processor for performing orthogonal rotations or transformations.

The following conceptual framework is helpful in understanding the broad scope of the invention, and the terms defined below have the indicated meanings throughout this application, including the claims.

The term "data" refers herein to signals that indicate or include information. When an item of data can indicate one of a number of possible alternatives, the item of data has one of a number of "values." For example, a binary item of data, also referred to as a "bit," has one of two values, such as "0" and "1" or "ON" and "OFF." An N-bit item of data has one of $2^N$ values.

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

"Memory circuitry" or "memory" is any circuitry that can store data. Examples include semiconductor ROMs and RAMs. A "memory cell" is memory circuitry that can store a single unit of data, such as a bit or other binary digit or an analog value.

An operation or a signal "writes" or "sets" memory circuitry or a memory cell by storing data in the memory circuitry or memory cell. If the data stored is different than data previously stored in the memory circuitry or memory cell, the operation or signal "changes" the data. An operation or a signal "reads" memory circuitry or a memory cell by producing data indicating the value of data currently stored in the memory circuitry or memory cell. Memory circuitry or a memory cell is "accessed" by any operation or signal that reads or writes the memory circuitry or memory cell. An item of data currently stored in memory circuitry or a memory cell is "accessed" by an operation or signal that reads the item of data or that writes another item of data, possibly identical to the current item of data, in place of the current item of data. An operation or signal "addresses" a memory cell within memory circuitry that includes plural memory cells by selecting the memory cell to be accessed. An operation or signal "enables" an access operation by putting memory circuitry or memory cell into a state in which it can be read or written.

A signal "requests" or "is a request for" an event or state when the signal can cause occurrence of the event or state.

An "array" of memory cells is a number of memory cells that are addressed or accessed in an interdependent manner.

A "register" is memory circuitry that includes an array of memory cells for temporary storage of data. A "shift register" is a register in which the data stored in each of the memory cells can be shifted along a dimension of the array to a next memory cell. If the shift register includes a one dimensional array of memory cells, each storing a bit of data, the shifting operation can receive and store a series of bits of data or it can provide a series of bits of data as output.

A "processor" is any circuitry that can process data, and may include one or more central processing units or other processing components. A "processing unit" is a processor that is a component within another processor.

"Processing circuitry" is circuitry within a processing unit that processes data. A "microprocessor" is a processor in the form of circuitry on a substrate.

A processor "operates on" an item of data by performing an operation that includes obtaining a resulting item of data that depends on the item of data operated on. For example, the resulting item of data could result from an operation that accesses the item of data operated on or from a logical or numerical operation on the item of data operated on.

A "data unit" or "unit of data" is an item of data that a processor can access or otherwise operate on as a unit. For example, an eight-bit byte is a data unit in many data processing systems.

A "block" of items of data is a number of items of data that form a sequence.

A processor "uses" an item of data in performing an operation when the result of the operation depends on the value of the item. For example, the operation could perform a logical or numerical operation on the item or could use the item to access another item of data.

An "address" is an item of data that can be used to address a memory cell within memory circuitry that includes plural memory cells.

An "instruction" is an item of data that a processor can use to determine its own operation. A processor "executes" a set of instructions when it uses the instructions to determine its operations. Execution of instructions "causes" a processor to perform an operation when the processor performs the operation in the process of executing the instructions.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

An operation "encodes" items of data when performing the operation on the items of data produces different items of data from which the encoded data items can subsequently be recovered. The operation that recovers the encoded data items is "decoding."

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

An operation or event "transfers" an item of data from a first component to a second if the result of the operation or event is that an item of data in the second component is the same as an item of data that was in the first component prior to the operation or event. The first component "provides" the data, and the second component "receives" the data.

A first component provides an item of data to a plurality of other components "in parallel" when all of the other components receives the item of data from the first component at approximately the same time.

"Control circuitry" is circuitry that provides data or other signals that determine how other components operate. For example, "instruction circuitry" is control circuitry that provides items of data indicating instructions to a component that includes processing circuitry. Similarly, "address circuitry" is control circuitry that provides items of data indicating addresses to a component that includes memory circuitry.

A first component "controls" a second component when signals from the first component determine how the second component operates.

A signal from control circuitry "indicates" or "selects" a subset of a set of components when the signal determines that an operation affects components in the subset differently than it affects other components in the set. For example, a signal can indicate one of a set of components as a source of data or can indicate a subset of the set of components as destinations of data.

Any two components are "connected" when there is a combination of circuitry that can transfer signals from one of the components to the other. For example, two components are "connected" by any combination of connections between them that permits transfer of signals from one of the components to the other. Similarly, a plurality of components are "interconnected" when each component is connected to every other component in the plurality through some combination of connections.

The terms "coprocessor" and "host processor" are complementary terms. A "host processor" is capable of operating independently but it can also be connected to a "coprocessor" so that the host processor and the coprocessor operate in an interdependent manner.

"Connecting circuitry" is circuitry that connects two or more components.

"Interconnecting circuitry" is circuitry that interconnects a plurality of components. The components are interconnected "into an array" by interconnecting circuitry that permits transfer of data to and from a component that can be mapped to a given position in an array only through connections to other components that can be mapped to adjacent positions in the array. The array is "one dimensional" if each component has at most two adjacent components, so that the components together can be mapped onto a line according to their interconnections.

"Bus circuitry" or a "bus" is circuitry connecting a plurality of components, at least one of which is a "source" and at least one of which is a "destination," such that the bus circuitry is capable of transferring a signal provided by any of the sources to all of the destinations. Some devices connected to bus circuitry can act either as sources or destinations.

Control circuitry provides signals that "control" transfer of data by bus circuitry if the signals determine sources and destinations of the transfers of data by the bus circuitry. For example, the control circuitry could provide signals to a source so that it provides an item of data to the bus circuitry; the control circuitry could also provide signals to one or more destinations so that they receive the item of data from the bus circuitry.

A "parallel processor" is a processor that includes more than one processing unit, each able to perform operations on data in parallel with the others.

An operation "evenly distributes" items of data among a plurality of processing units when the maximum difference between the number of items of data received by any pair of the processing units is one.

A bus receives, transfers, or provides an item of data that includes more than one bit "in parallel" if the bits of the item are received, transferred, or provided at approximately the same time.

Figure 13:
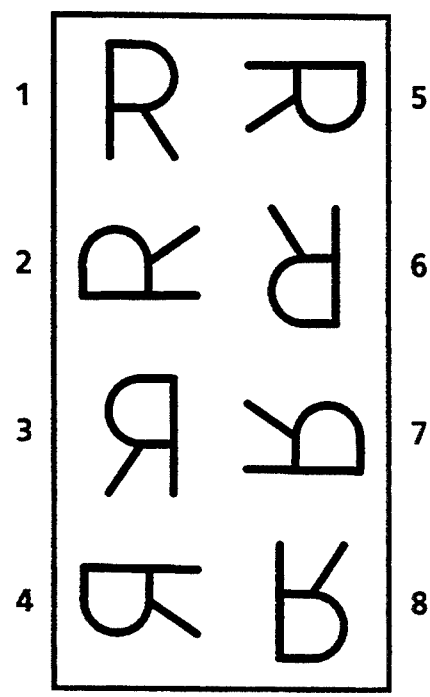
FIG. 13 is a schematic representation showing all eight possible orthogonal rotations.

"Orthogonal transformations" or "orthogonal rotations" are a set of data manipulation operations that convert bitmap data into one of its eight orthogonal orientations. As shown in FIG. 13, the eight orthogonal orientations can be identified as: 1) Identity; 2) 270 Degree Rotation; 3) Mirror Y; 4) Transpose Major; 5) 90 Degree Rotation; 6) 180 Degree Rotation; 7) Transpose Minor; and 8) Mirror X.

B. General Features

Figure 2:
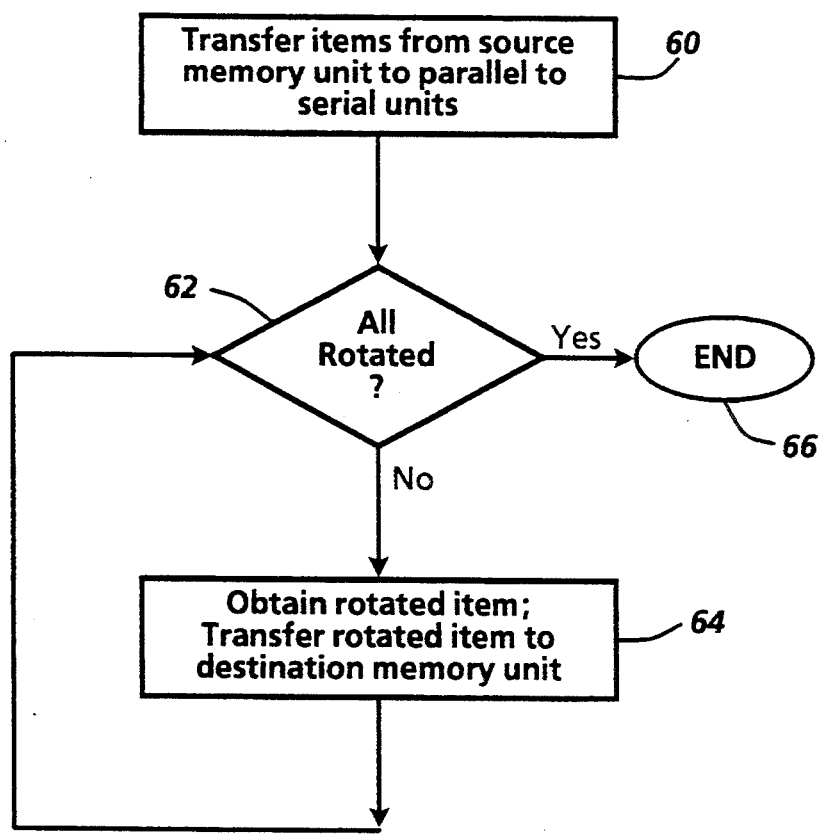
FIG. 2 is a flow chart showing the actions taken by the components of FIG. 1 to perform the orthogonal transformations.

FIGS. 1 and 2 illustrate general features of the invention. FIG. 1 shows components of a parallel processor for performing orthogonal rotations or transformations. FIG. 2 shows the actions taken by the components of FIG. 1 to perform the orthogonal transformations.

One way to perform a type of orthogonal transformation, for example a 270 degree rotation, is to divide an image file into squares or rectangles, rotate each square or rectangle, then place the results accordingly in a destination image file. As will be appreciated, this approach is taken by two dimensional processors but can also be utilized by the one dimensional processor of the present invention described below.

System 10 in FIG. 1 includes P memory units, including memory units 12, 14, and 16, illustratively numbered zero through (P-1). Each memory unit in system 10 has address connections for receiving address signals, data connections for providing and receiving data signals, and select connections for receiving select signals. In order to accomplish the orthogonal rotations as will be discussed below, the memory units in system 10 must have the capacity to store both source data and the subsequently rotated destination data. Each memory unit in system 10 is capable of being a source memory unit having a source data, or a destination memory unit having destination data at any time during the rotation operation.

System 10 also includes rotation circuitry 50. Rotation circuitry 50 performs rotations in the forms of orthogonal transformations by transforming the source data from the source memory units into rotated destination data. Note that both the source and destination images are binary images (i.e. 1 bit/pixel). System 10 as shown is only capable of rotating binary images.

Rotation circuitry 50 includes P parallel to serial units 24, 26, and 28, illustratively numbered zero through (P-1). Each parallel to serial unit has a plurality of input connections and an output connection, the input connections receive data signals in parallel from any of the memory units. That parallel to serial unit stores the data signals, and provides a serial output data signal on its output connection. It can be appreciated that each parallel to serial unit can be made to function as a serial to parallel unit.

Rotation circuitry 50 also includes rotation buffer 38. Rotation buffer 38 has a plurality of input and output connections, each input connection receives the serial output data signal from a respective one of the output connections from the parallel to serial units. For instance, parallel to serial unit 0, numbered 24, has its serial output connection 40 connected to a specific input connection of rotation buffer 38. In a similar manner parallel to serial unit 1, numbered 26, is connected to rotation buffer 38 through line 42 and parallel to serial unit (P-1), numbered 28 is connected to rotation buffer 38 through line 44. As will be seen, the output connections of rotation buffer 38 provide data to any of the data connections of the memory units in the system.

System 10 includes interconnecting circuitry for interconnecting any of the input connections of the parallel to serial units in rotation circuitry 50 with any of the data connections of the memory units, and for connecting the output connections of rotation buffer 38 of rotation circuitry 50 with any of the data connections of the memory units. As illustrated in FIG. 1, memory unit 0, numbered 12, has associated interconnecting circuitry 18 for communicating data with other elements in system 10 using common bus 30. In a similar manner, memory unit 1, numbered 14, has interconnecting circuitry 20 for communicating with common bus 30, and memory unit (P-1), numbered 16, communicates with common bus 30 using interconnecting circuity 22.

Rotation circuitry 50 also utilizes interconnecting circuitry to communicate data to other elements in system 10. Parallel to serial unit 0, numbered 24, has associated interconnecting circuitry 32 for communicating data to common bus 30. In a similar manner, parallel to serial unit 1, numbered 26, has interconnecting circuitry 34 for communicating with common bus 30, and parallel to serial unit (P-1), numbered 28 communicates with common bus 30 using interconnecting circuity 36. Also included in the interconnecting circuitry is interconnecting circuitry 46 which connects the outputs of rotation buffer 38 with common bus 30 facilitating communication to other elements in system 10.

Reversing buffer 54 is an addition to system 10 which allows special types of orthogonal transformations to be performed in a minimal amount of steps. For instance, a 180 degree rotation can be performed with fewer processing steps using the reversing buffer than performing the same rotation by doing two 90 degree rotations. Reversing buffer 54 has associated interconnecting circuitry 56 for communicating with common bus 30. Reversing buffer 54 receives a word on its input and provides a reversed bit order of that word on its output.

System 10 also includes control circuitry 52. Control circuitry 52 provides control signals to the P memory units 12, 14, and 16, rotation circuitry 50, and the interconnecting circuitry described above. Control circuitry 52 causes the interconnecting circuitry to transfer data between the memory units and the rotation circuitry. Control circuitry 52 further includes address circuitry for simultaneously providing common address signals to the address connections of all of the memory units and selection circuitry for providing the select signals to the memory units. The select signals select one of the memory units as the source memory unit and one of the memory units as the destination memory unit during the rotation function. Control circuitry 38 further controls interconnecting circuitry 56 of reversing buffer 54 when the function provided by buffer 54 is necessary.

In general, each of the parallel to serial units hold a row of the source rectangle. The set of pixels available at any one time on the combined outputs of the parallel to serial units represent one column of the source rectangle.

FIG. 2 illustrates the steps necessary for the components of FIG. 1 to successfully perform an orthogonal rotation. Step 60 causes a predetermined number of items, or data, to be transferred from the source memory unit to the respective parallel to serial units in rotation circuitry 50. The items are rotated by rotation circuitry 50. Step 62 is a decision asking if all of the items to be rotated have been. If the answer is no, step 64 is executed. The rotated items are obtained from the rotation circuitry 50 and stored in the proper destination memory unit. The process is repeated until all items have been rotated and step 66 calls for an end to the procedure.

C. General Implementation Features of a One Dimensional SIMD Array

The general features described above for a one dimensional processing array in relation to FIGS. 1 and 2 could be implemented in many different ways with a wide variety of components and with various integrated circuit technologies. The following implementation employs commercially available byte-slice integrated circuits arranged in a SIMD architecture to perform coprocessing in a Sun SPARCStation workstation.

Figure 3:
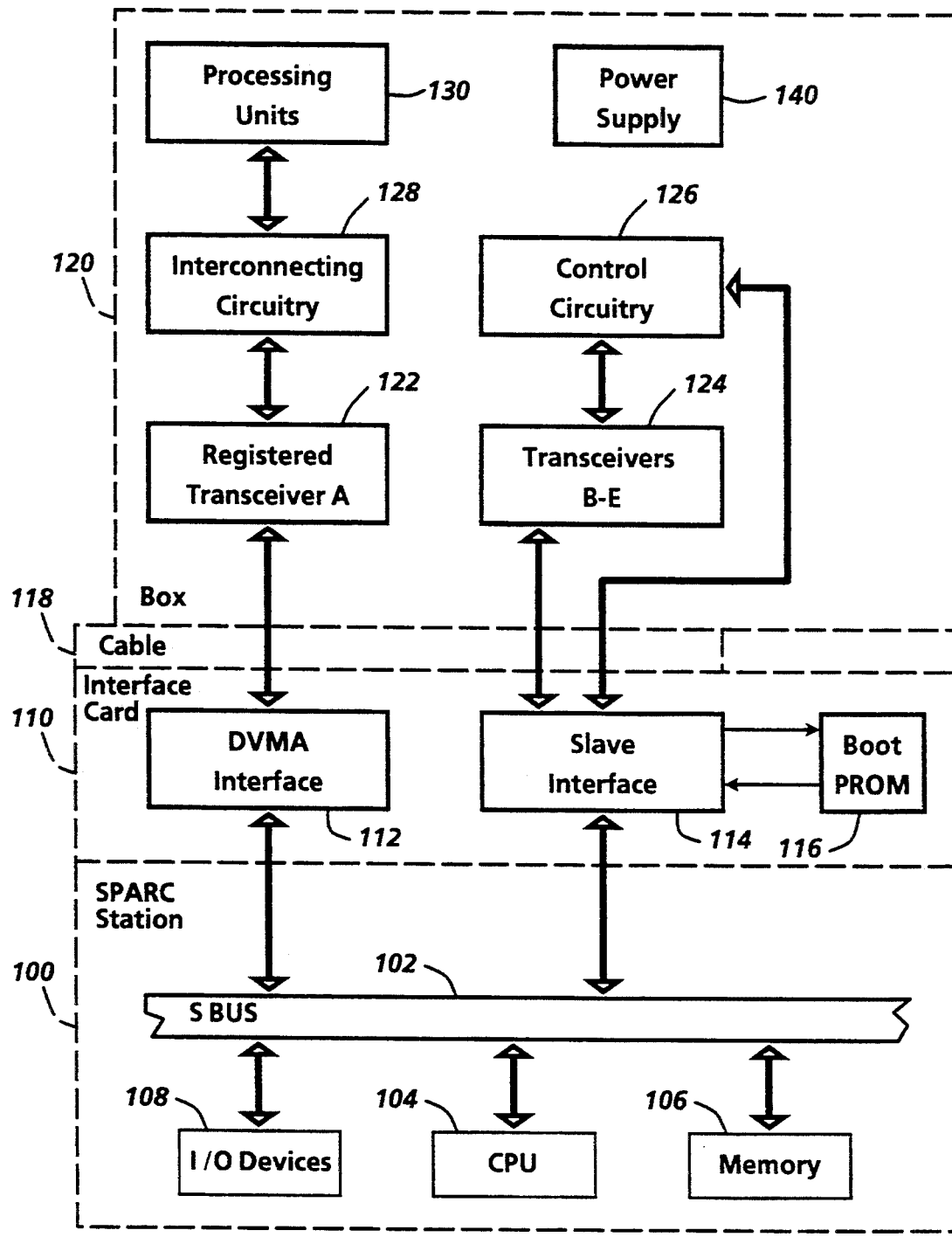
FIG. 3 is a schematic block diagram showing components in an implementation of a SIMD parallel processor connected to an SBus of a SPARCStation.
Figure 4:
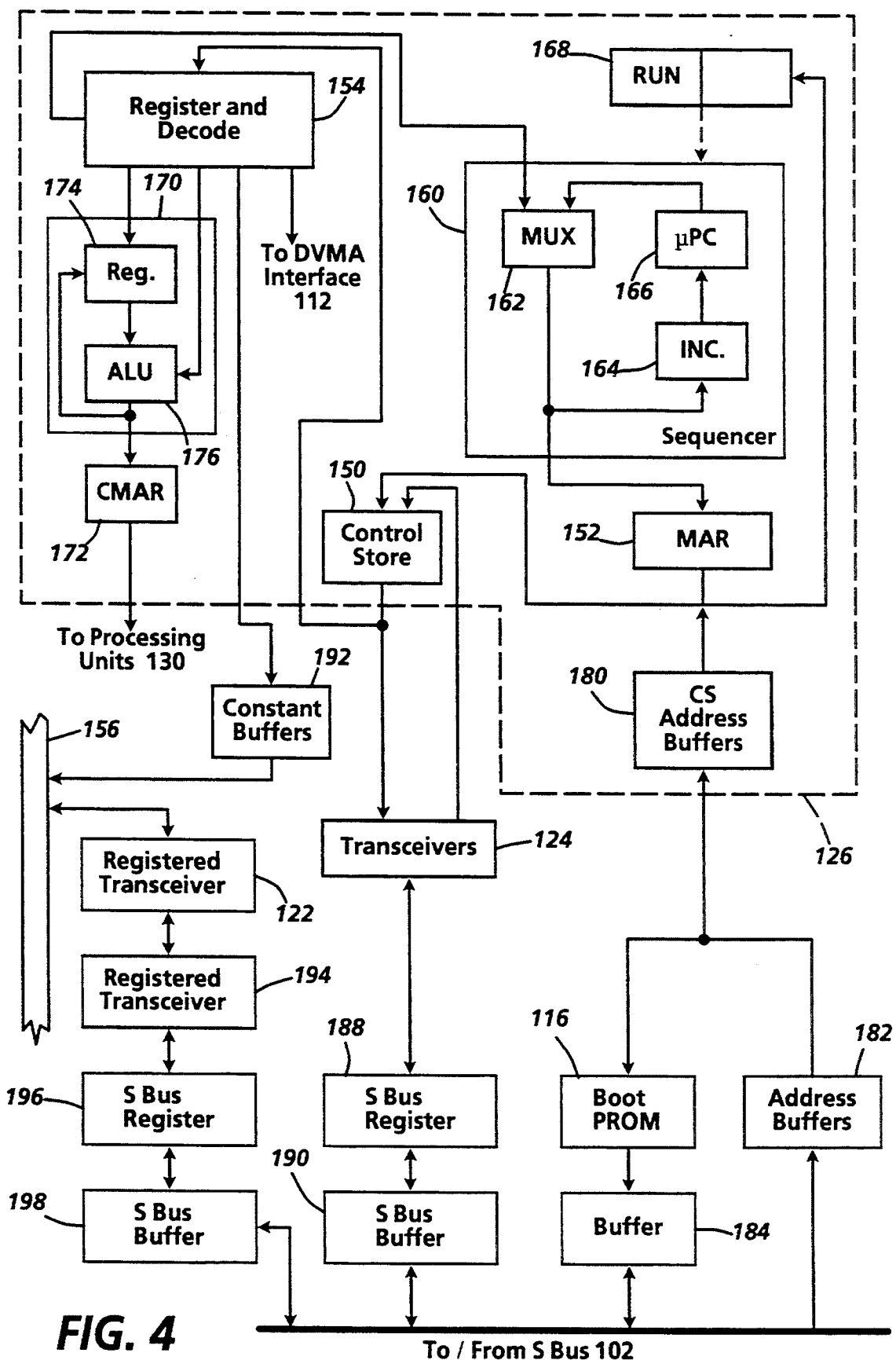
FIG. 4 is a schematic block diagram showing components of the control circuitry of FIG. 3.
Figure 5:
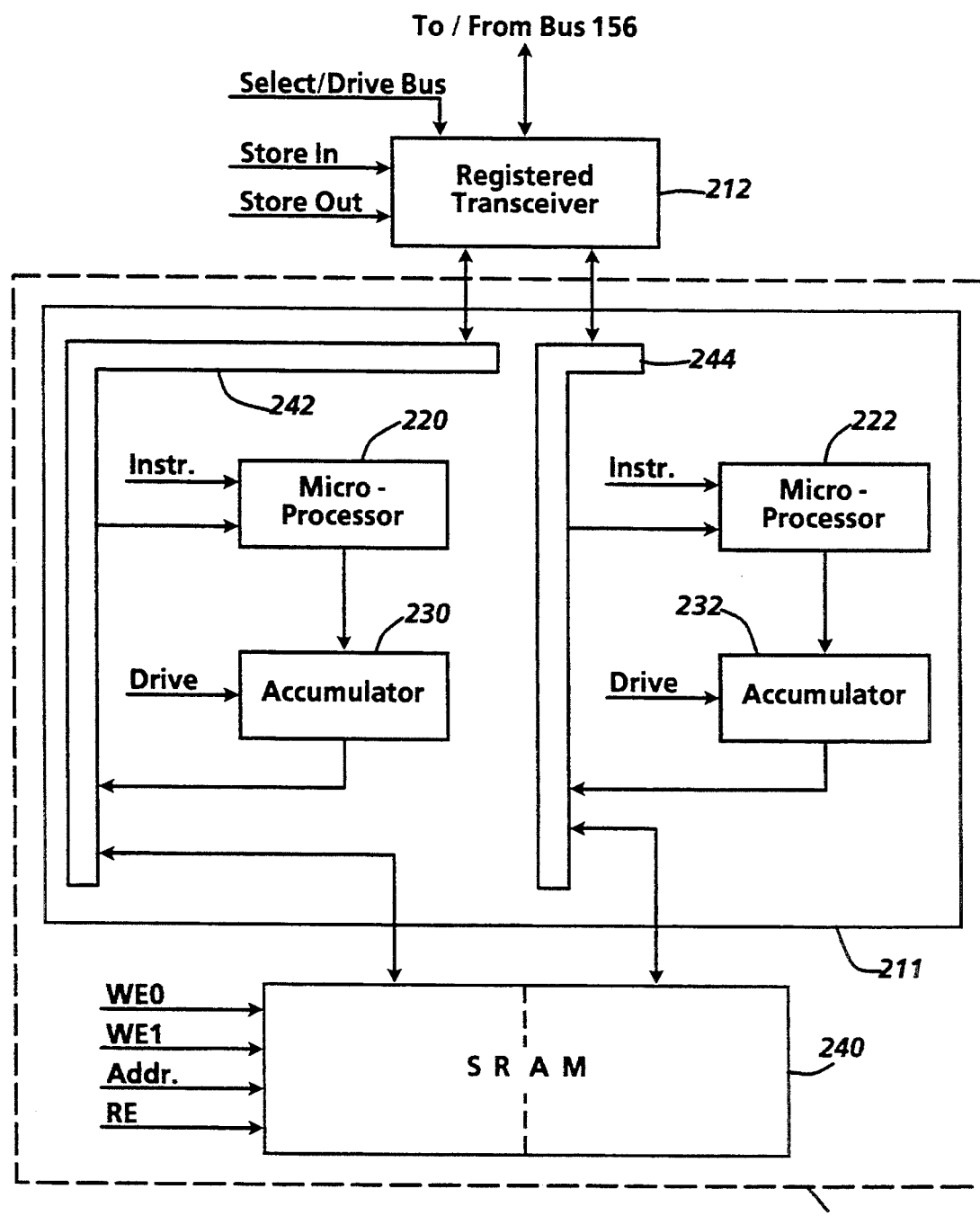
FIG. 5 is a schematic block diagram showing components of a processing unit in FIG. 3.
Figure 6:
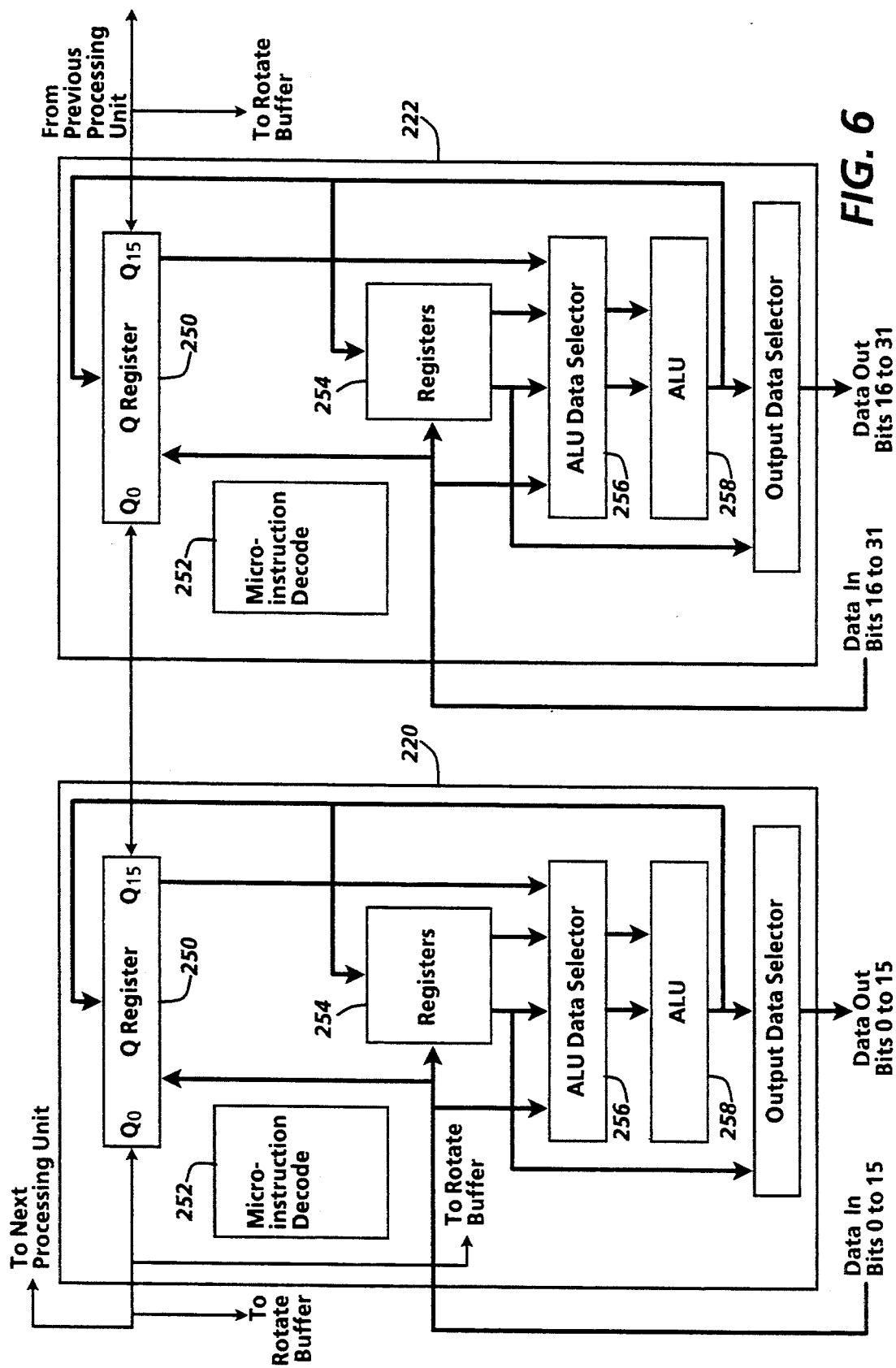
FIG. 6 is a general overview block diagram of two IDT49C402B 16 bit microprocessors connected to form a 32 bit processor.
Figure 7:
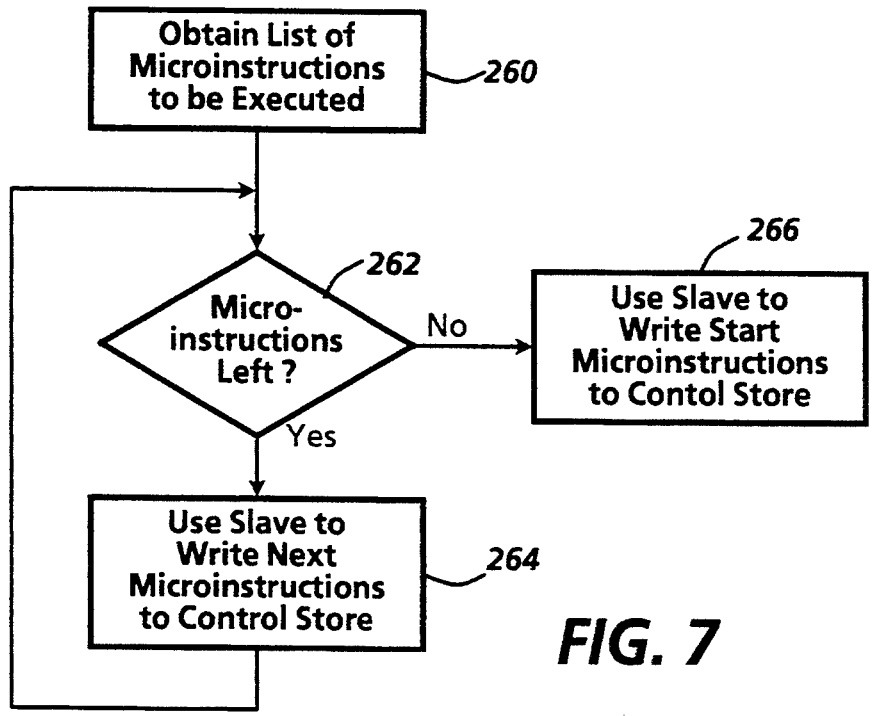
FIG. 7 is a flow chart showing general acts in loading microinstructions in a control store in FIG. 4.
Figure 8:
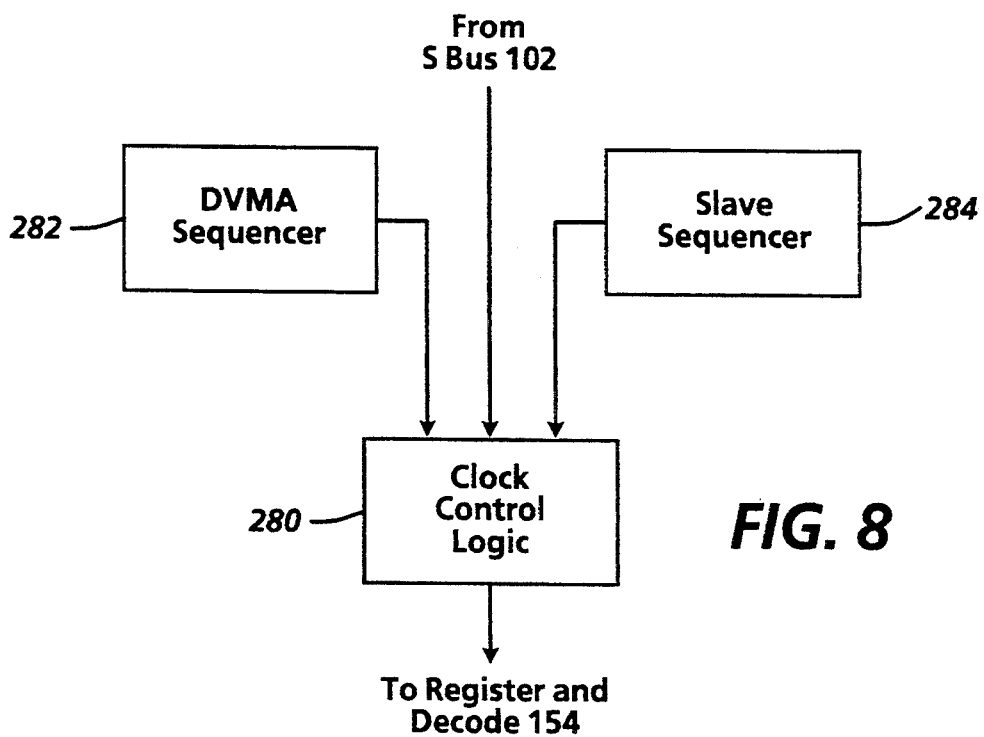
FIG. 8 is a schematic block diagram showing components that control clock signals to a box in FIG. 3.

FIG. 3 shows general components of the implementation and their connections to components in the host workstation. FIG. 4 shows components of the control circuitry in FIG. 3. FIG. 5 shows components of a processing unit in FIG. 3. FIG. 6 shows the processing components of a processing unit. FIG. 7 shows general acts in writing microinstructions to the control store in FIG. 4. FIG. 8 shows components that provide clock signals to components shown in FIGS. 4 and 5 for microinstruction execution.

FIG. 3 shows an implementation in which SPARC-Station 100 serves as a host. SPARCStation 100 includes SBus 102, to which are connected central processing unit (CPU) 104, memory 106, and input/output (I/O) devices 108. Memory 106 has sufficient capacity to store image data defining several full size images, each requiring at least 1 megabyte of memory. Memory 106 can also store instruction data indicating conventional instructions CPU 104 can execute to perform operations on the image data, including compression, decompression, and other image manipulation operations. I/O devices 108 may include scanners, printers, modems, displays, disk drives, network connections, and other sources and destinations of data defining images.

Mounted in SPARCStation 100 is interface card 110, a printed circuit board on which are mounted components that form direct virtual memory access (DVMA) interface 112, slave interface 114, and boot PROM 116, a programmable read-only memory component. Interface card 110 also holds conventional connectors (not shown) for mounting card 110 into SPARCStation 100 and for providing an electrical connection to SBus 102. Interface board also holds conventional connectors (not shown) to which cable 118, which may be as short as 12 inches, can be mounted to provide an electrical connection to box 120. Circuitry (not shown) formed on a surface of interface card 110 provides electrical connections between the connectors and DVMA interface 112 and slave interface 114 and between slave interface 114 and boot programmable read only memory (PROM) 116.

DVMA interface 112, a master interface, and slave interface 114 can be implemented in accordance with SBus Specification B. O., Sun Microsystems, Inc. Part No. 800-5922-10, 1990, which describes signal protocols for SBus master and slave interfaces. Each interface can have a respective sequencer. In addition, as described below, card 110 includes a number of components that provide signals to components in box 120 or receive signals from components in box 120, thus performing functions of DVMA interface 112 or slave interface 114.

Boot PROM 116 can be an 8K×8 bit memory accessible by slave interface 114, which is only capable of byte reads from boot PROM 116 and of single word control store accesses.

Box 120 includes a printed circuit board with conventional connectors (not shown), to which cable 118 can be mounted to provide electrical connections to DVMA interface 112 and slave interface 114. Circuitry formed on the surface of the board (not shown) provides electrical connections from the connectors to components on the board, including registered transceiver 122, transceivers 124, and control circuitry 126. Registered transceiver 122, designated A, is further connected to interconnecting circuitry 128, which interconnects processing units 130. Transceivers 124, designated B–E, are connected through parallel lines to control circuitry 126. These transceivers can be implemented with conventional 32 bit bidirectional transceivers.

Box 120 also includes power supply 140, which can be a conventional power supply capable of providing approximately 40 amps at 5 volts, or 200 watts. Box 120 also contains a cooling fan (not shown).

The arrangement shown in FIG. 3 solves several problems in using a host workstation: For a SPARCStation, the card size and constraints on space, power consumption, signal loadings, and heat dissipation make it infeasible to include an entire SIMD parallel processor on a single card; therefore, box 120 includes the processing units, control circuitry, and most of the interconnecting circuitry, and card 110 includes only a small number of components that provide a connection between box 120 and SBus 102. In addition, dividing components into two modules in this way would allow card 110 to be replaced with an interface to another computer without significantly changing box 120. Finally, the extra space provided by box 120 facilitates debugging.

FIG. 4 shows components within control circuitry 126 and their connections to other components. In addition to the components shown, control circuitry 126 includes a conventional clock driver (not shown) for receiving and distributing the clock signal of SBus 102 at a frequency of 25 MHz, i.e. one cycle per 40 nsec, so that it can drive several components. The circuitry is designed so that control circuitry 126 can perform each possible instruction in one 40 nsec cycle. In other words, a new microinstruction and microinstruction address should be provided at each clock tick.

Control store 150 can be a 16K×128 bit static random access memory (SRAM) for storing microinstructions received from SBus 102. Upon receiving a microinstruction's address from memory address register (MAR) 152, a conventional register, control store 150 provides the microinstruction to microinstruction register and decode 154. Register and decode 154 provides various control signals, including instructions to the processing circuitry of each processing unit and buffer select signals to control transfer of data on common data bus 156.

Microcode sequencer 160 loads addresses into MAR 152. Multiplexer (MUX) 162 selects either a jump address from register and decode 154 or the address that immediately follows the previous address, generated by incrementer 164 and microprogram counter ($\mu$PC) 166. Sequencer 160 can be implemented with an IDT49C410 microprogram sequencer, described in 1990/1991 Logic Databook, Integrated Device Technology, Inc., Santa Clara, Calif., 1990, sections 5.4 and 7.4. Sequencer 160 can receive its opcodes directly from register and decode 154.

Control/status register 168 is a conventional register whose most significant bit, called the RUN bit, indicates whether sequencer 160 should perform normal addressing or should provide a special address that holds the coprocessor. The IDT49C410 sequencer has a Jump-Zero instruction to which it responds by providing the address of location 0 to MAR 152. Therefore, the special address can be location 0, and the microinstruction at location 0 in control store 150 can in general be a nonoperative (no-op) instruction that is repeatedly retrieved until the microprogram is ready to execute.

The RUN bit can be cleared by the SBus reset signal when SPARCStation 100 is reset. Slave interface 114 can also read or write control/status register 168, which could include only the RUN bit. The address space addressed by CS address buffers 180 can be divided so that only the first few bits of an address are used to decode whether the address is that of control/status register 168.

As suggested by the dashed line from control/status register 168 to sequencer 160, the RUN bit is not provided directly to sequencer 160, but is received by register and decode 154, which then responds appropriately. While the RUN bit is set, register and decode 154 receives in each cycle a microinstruction fetched from control store 150 and, in the next cycle, decodes the microinstruction and executes it by providing control signals to other components. Upon detecting that the RUN bit has been cleared, however, register and decode 154 provides a JumpZero instruction to sequencer 160 and ignores whatever microinstruction has been fetched in the previous cycle.

After a microprogram has been stored in control store 150, execution of the microprogram can be caused by writing a microinstruction to location 0 that, when executed, provides the starting address of the microprogram to sequencer 160 and again sets the RUN bit so that sequencer 160 can begin normal addressing. Since the microinstruction from location 0 is fetched from control store 150 twice before the first instruction of the microprogram is fetched, every microprogram should begin with a no-op instruction that provides a "Continue" opcode to sequencer 160. This causes incrementer 164 to increment the address in $\mu$PC 166, beginning normal address incrementing.

The final operation of each microprogram can write a completion code to a location in SPARCStation memory, and whenever the SPARCStation sees the completion code, it can clear the RUN bit. Until the RUN bit is cleared, the microprogram can perform a no-op loop or, alternatively, the microprogram itself could clear the RUN bit after writing the completion code.

Address processor 170 loads addresses into cache memory address register (CMAR) 172, connected to provide an address to each processing unit. The previous address provided to CMAR 172 can be stored in register 174. Alternatively, an address from register and decode 154 can be loaded directly into register 174. ALU 176 can then operate on the value in register 174 to obtain the next address. Address processor 170 can be implemented with an IDT49C402B microprocessor, described in 1990/1991 Logic Databook, Integrated Device Technology, Inc., Santa Clara, Calif., 1990, sections 5.3 and 7.2. Register 174 can be the Q register or any of the other internal registers of address processor 170. Register and decode 154 can provide instructions, register specifiers, a carry signal, and addresses to address processor 170, and can also provide a write enable signal to the memory circuitry of one or more processing units.

Control store address buffers 180 are connected to receive addresses from address buffers 182 in slave interface 114 on interface card 110. This provides a path through which CPU 104 in SPARCStation 100 can provide an address to control store 150. Also, SBus 102 can provides two address bits through this path that are hardwired to logic that write enables 32 bits of SRAM or one 32 bit bank of SRAM at a time, since only one 32 bit word at a time can be received from SBus 102.

Each of transceivers 124 is connected to provide 32 bits to SBus register 188 on interface card 110, which in turn can provide data to SBus buffer 190, all of which can be implemented with conventional 32 bit components. This circuitry provides a path through which one 32 bit segment at a time of a 128 bit microinstruction in control store 150 can be read to SBus 102, one of the functions of slave interface 114.

Transceivers 124 are also connected to receive data from SBus register 188, which in turn receives data from SBus 102 through SBus buffer 190. Therefore, this circuitry also provides a path through which a microinstruction from SBus 102 can be loaded into control store 150, another function of slave interface 114.

In addition to providing addresses for control store 150 and for control/status register 168, address buffers 182 also provide addresses to boot PROM 116. Boot PROM 116 is read at boot time to identify card 110. Therefore, it begins at address 0 relative to its SBus slot. Boot PROM 116 stores data that indicates FCode instructions that can be executed by CPU 104 during boot to obtain data indicating an identifier of card 110, including what kind of card it is and which revision; indicating address space parameters; and indicating what driver should be loaded to communicate with card 110. These instructions can be written according to conventional techniques using the instructions set forth in SBus Specification B. O., Sun Microsystems, Inc. Part No. 800-5922-10, 1990, Appendix C, pp. 143–168, entitled "FCode Reference." Each instruction from boot PROM 116 is provided to SBus 102 through buffer 184.

Boot PROM 116 is read using byte accesses. If CPU 104 tries to read a 32 bit word during boot time, slave interface 112 responds by returning a byte response on Ack[2:0], causing CPU 104 to read one byte at a time. Boot PROM 116 drives only the most significant byte of the SBus data line.

FIG. 4 also shows constant buffers 192, a set of buffers through which register and decode 154 can provide data to common data bus 156. Common data bus 156 is also connected to processing units 130 and is therefore a part of interconnecting circuitry 128 in FIG. 3.

As shown, common data bus 156 is also connected to receive data from SBus 102 and provide data to SBus 102 through registered transceiver 122, designated A in FIG. 3. Transceiver 122 is connected to provide 32 bits to registered transceiver 194 on interface card 110, which in turn can provide data to SBus register 196 and SBus buffer 198, all of which can be implemented with conventional 32 bit components. This circuitry provides a path through which an item of data can be transferred from a processing unit to SBus 102, one of the functions of DVMA interface 112.

Transceiver 122 is also connected to receive data from registered transceiver 194, which in turn receives data from SBus 102 through SBus register 196 and SBus buffer 198. Therefore, this circuitry also provides a path through which an item of data can be transferred from SBus 102 to a set of processing units, another function of DVMA interface 112.

Register and decode 154 is also connected to provide some control signals directly to DVMA interface 112 on card 110. As a result, a microinstruction can provide signals to DVMA interface 112 so that it acts as a master on SBus 102.

FIG. 5 shows processing unit 210, the pth one of processing units 130, together with respective registered transceiver 212. Registered transceiver 212 provides a connection through which processing unit 210 receives data from common data bus 156 and provides data to common data bus 156. Therefore, registered transceiver 212 is a part of interconnecting circuitry 128 in FIG. 3. Registered transceiver 212 can be implemented with a 32 bit set of conventional registered transceivers, such as four 8 bit 74FCT651 transceivers from Integrated Device Technology, Inc., or any equivalent circuitry, such as two 16 bit transceivers. Registered transceiver 212 responds to signals from register and decode 154 by storing data from bus 156; by storing data from buses 242 and 244; by driving bus 156; or by driving buses 242 and 244.

Processing unit 210 includes microprocessors 220 and 222, each of which can be implemented with an IDT49C402B microprocessor, described in 1990/1991 Logic Databook, Integrated Device Technology, Inc., Santa Clara, Calif., 1990, sections 5.3 and 7.2.

Accumulators (ACC) 230 and 232 are connected to receive data output by microprocessors 220 and 222, respectively. Accumulators 230 and 232 are necessary because microprocessors 220 and 222 do not produce cache write data quickly enough. In addition, accumulators 230 and 232 make it possible to perform an operation while shifting a microprocessor's Q register, because the output from each microprocessor's ALU can be stored in its accumulator and then fed back to the microprocessor's data input during the next cycle. Each accumulator can be implemented with a conventional 16 bit register with tri-state outputs. The accumulators are controlled in parallel by signals from register and decode 154 indicating whether to provide output.

Processing unit 210 also includes static RAM (SRAM) 240, a 64K×32 bit memory, connected through internal buses 242 and 244 so that 16 bits of each data unit are accessible by microprocessor 220 and the other 16 bits are accessible by microprocessor 222. SRAM 240 can be implemented with a Motorola MCM3264 module. An array of P processing units, each with one such memory module, can thus store a total of P*2M bits of data. SRAM 240 and each of the other memory modules receives addresses in parallel from CMAR 172, and each memory module also receives write enable signals and read enable signals from register and decode 154. Signals from register and decode 154 can write enable or read enable both halves of a data unit, and separate signals can also indicate write enables to each half of each data unit. SRAM 240 can be managed as a cache memory.

As shown, internal buses 242 and 244 are each connected to registered transceiver 212 and to SRAM 240. In addition, bus 242 is connected to receive data from accumulator 230 and to provide data to processor 220, while bus 244 is connected to received from accumulator 232 and to provide to processor 222. Data transfer on internal buses 242 and 244 is controlled by signals from register and decode 154 to registered transceiver 212, to accumulators 230 and 232, and to SRAM 240 indicating which source should drive the buses. The signal to SRAM 240 is a read enable signal as mentioned above.

Data can be transferred from SBus 102 to either of microprocessors 220 and 222 by first writing the data into SRAM 240 through the respective internal bus 242 or 244. Then the data is read onto the respective internal bus 242 or 244 and the microprocessor executes an instruction causing it to read data from the internal bus. Rather than following this path, data could be provided more directly to each microprocessor. For example, register and decode 154 could be connected to a separate transfer enable line for each microprocessor, so that data from bus 102 could be written directly to each microprocessor.

If SRAM 240 is implemented with a dual port memory component, rather than a single port component as shown, microprocessors 220 and 222 can be connected to one memory port and registered transceiver 212 can be connected to the other. Write accesses from the microprocessors and from registered transceiver 212 can be synchronized to prevent collisions.

Register and decode 154 includes logic that produces control signals in response to microinstructions from control store 150 according to conventional techniques. The microinstructions could be encoded in a wide variety of ways. For example, each microinstruction could include a three bit field indicating a source to drive bus 156; a two bit field indicating a source to drive buses 242 and 244; a six bit field indicating which SRAMs are write enabled; a ten bit field indicating an instruction for the microprocessors; two six bit fields indicating microprocessor A register and B register, respectively; a two bit field to set microprocessor carry inputs; a ten bit field indicating an instruction for address processor 170; two six bit fields indicating A register and B register, respectively, in address processor 170; a four bit field indicating an instruction for sequencer 160; a two bit field that selects a source for a single bit that controls whether a branch is taken; a single bit field indicating loading of μPC 166 in sequencer 160; a single bit field indicating the carry in of sequencer 160; a single bit field indicating the carry in of address processor 170; and a sixteen bit field indicating a constant for sequencer 160, address processor 170, or the microprocessors.

FIG. 6 is an overview block diagram showing the internal functions of microprocessors 220, 222 of FIG. 5. In this implementation, each microprocessor 220, 222 includes arithmetic logic unit (ALU) 258, ALU data selector 256, Q register 250 including internal shift logic so that registers can be cascaded to form very long shift registers, a 64-register bank 254, and microinstruction decode logic 252. An array of P processing units, each with two 16 bit microprocessors, can thus load, store, or operate on 32*P bits per clock cycle. All the microprocessors can receive signals indicating instructions in parallel from register and decode 154. As shown in FIG. 6, the leftmost bit of Q register 250 is designated as the LSB to be consistent with the description set forth in the 1990/1991 Logic Databook, Integrated Device Technology, Inc., Santa Clara, Calif., 1990, sections 5.3 and 7.2.

In FIG. 7, the act in box 260 obtains a list of microinstructions to be executed. Host CPU 104 can, for example, obtain a list by retrieving a list from memory 106 or by executing instructions that produce a list.

The act in box 262 begins an iterative operation that loads each microinstruction into control store 150. During the act in box 264 for each iteration, slave interface 114 writes a microinstruction into control store 150. Host CPU 104 can, for example, provide an address to address buffers 182 and a series of four 32 bit microinstruction segments to SBus buffer 190, together with signals to a sequencer in slave interface 114 requesting each 32 bit microinstruction segment be loaded at the address.

In response to the request, slave interface 114 can provide control signals to transfer each microinstruction segment in the series to SBus register 188 and to a respective one of transceivers 124. Each microinstruction is received in four 32 bit segments, and each 32 bit segment is written to control store 150 as it is received. Slave interface 114 can also provide control signals to transfer the address to CS address buffers 180 and to control the output from MAR 152 so that the address in CS address buffers 180 is presented at the address port of control store 150. Slave interface 114 can also provide signals to write enable 32 bits of SRAM in control store 150. Then, slave interface 114 can provide a write signal to control store 150 so that a 32 bit segment of the microinstruction is written into the write enabled 32 bits at the address in CS address buffers 180.

A special start sequence of microinstructions can be written into an appropriate location in control store to start execution of a list of microinstructions. Therefore, when the list is completely written into the control store, the act in box 266 is performed, during which slave interface 114 writes the start sequence.

When the RUN bit is clear, as described above, sequencer 160 can repeatedly receive a JumpZero instruction, so that it repeatedly fetches a no-op microinstruction at location 0. The start sequence can therefore be written by writing a JUMP-to-location-n microinstruction to location 0, where n is the starting location of the microinstructions to be executed next. Subsequently, the RUN bit can be set by slave interface 114 in response to the current SBus master.

Due to pipelining, each JUMP microinstruction affects two cycles, the first to obtain and latch the address of the next microinstruction into MAR 152 and the second to fetch the microinstruction at the address in MAR 152. Therefore, the address in MAR 152 is that of location 0 until the JUMP-to-location-n microinstruction is executed, and as a result of the preceding JUMP-to-location-0 microinstruction, the JUMP-to-location-n microinstruction is again fetched from location 0.

Because the JUMP-to-location-n microinstruction is fetched twice, it is executed twice. Each time it is executed, the microinstruction at location n is fetched. Therefore, the microinstruction at location n is also executed twice, and it can be a processor no-op that provides a "Continue" opcode to sequencer 160, causing sequencer 160 to start incrementing the address so that the microinstruction at location n+1 is fetched, and so forth.

Before the act in box 260 and after the act in box 266, host CPU 104 can perform any of a wide variety of activities. For example, if host CPU 104 is managing a queue of lists of microinstructions, each to be loaded to control store 150 in the manner shown in FIG. 6, CPU 104 can maintain the queue and perform any operations necessary to obtain subsequent lists on the queue. CPU 104 can also perform operations to determine whether the next list on the queue is already loaded into control store 150, in which case it need not be loaded again, but can be called by loading a JUMP-to-location-n microinstruction as in the act in box 266. Host CPU 104 can perform multitasking, in which case it can perform other tasks after loading a list of microinstructions. Or it could wait for execution of the list to be completed or for an interrupt from the coprocessor.

FIG. 8 illustrates components that control clock signals so that a microinstruction can be loaded into control store 150 without interfering with execution of a previous microinstruction. Clock control logic 280 on card 110 receives clock signals from SBus 102, as do other components on card 110 including DVMA sequencer 282, slave sequencer 284, and SBus register 188. Clock control logic 180 always provides a clock signal to components in box 120, unless it receives a signal from DVMA sequencer 282 or from slave sequencer 284 indicating clock signals should not be provided to box 120. For example, whenever slave sequencer 284 is providing control signals to load a microinstruction into control store 150, it provides a signal to clock control logic 180 to prevent clock signals. In general, DVMA sequencer 282 stops clock signals when DVMA sequencer 282 either is attempting to gain control of SBus 102 as indicated by a Bus Grant signal from an SBus arbiter or is awaiting a signal from slave sequencer 284 on the SBus Ack[2:0] lines.

Each clock signal from clock control logic 280 goes to register and decode 154 and can also go directly or via register and decode 154 to any other component in box 120 that requires a clock signal. Register and decode 154 responds to a clock signal by decoding a microinstruction read from control store 150. Other components that include registers must also receive clock signals. For example, in the implementation of FIGS. 4 and 5, sequencer 160, address decoder 170 and microprocessors 220 and 222 must receive clock signals because of their internal registers. Similarly, registered transceivers 122, 194, and 212; MAR 152; CMAR 172; SBus registers 188 and 196; and accumulators 230 and 232 must receive clock signals although, as noted above, SBus register 188 can receive clock signals directly from SBus 102. Some other components may be implemented to require clock signals, such as control store 150 and SRAM 240; these components may also be implemented so that no clock signal is required, but with register and decode 154 providing read enable and write enable signals. A sequence of several clock signals may all involve a single microinstruction, from obtaining its address to storing data in SRAM 240 in response to its execution.

In addition to the general implementation features above, a number of features specific to this invention are set forth below.

D. General Application Features of a One Dimensional SIMD Array

The features described above can be used to implement other basic image processing operations, such as reduction, enlargement, tiling, and arithmetic operations on pixel values such as bit counting.

An implementation of reduction and enlargement using the features described above is described in co-pending coassigned U.S. patent application Ser. No. 07/993,939 pending, entitled "Subsampling and Spreading Circuitry for SIMD Architecture" ("the Subsampling/Spreading application"), incorporated herein by reference.

Another implementation of rotation using the features described above is described in copending coassigned U.S. patent application Ser. No. 07/993,169, now abandoned, entitled "One Dimensional SIMD Architecture For Performing Orthogonal Rotations," incorporated herein by reference.

An implementation of tiling using the features described above is described in copending coassigned U.S. patent application Ser. No. 07/993,286, now U.S. Pat. No. 5,428,804, entitled "Edge Crossing Circuitry For SIMD Architecture" ("the Tiling application"), incorporated herein by reference.

An implementation of arithmetic operations on pixel values using the features described above is described in copending coassigned U.S. patent application Ser. No. 07/993,925, now U.S. Pat. No. 5,408,670, entitled "Preventing Interpixel Signals During Multi-bit Multi-pixel Arithmetic", U.S. patent application Ser. No. 07/993,213 now U.S. Pat. No. 5,375,080, entitled "Obtaining Binary Logical Results for Multi-bit Pixels in Parallel", and U.S. patent application Ser. No. 07/993,938, pending, entitled "Masks for Selecting Multi-bit Pixels in a Multi-pixel Result", which are incorporated herein by reference.

As shown in this application and the other applications incorporated herein by reference, the implementation described above provides a one-dimensional SIMD array of processing units. Each processing unit can perform operations for one or more full height columns of pixels from an image. If the value of each pixel is indicated by more than one bit, the pixel values are stored horizontally rather than vertically, eliminating the need for corner turning operations between the host and the parallel processor.

The general implementation features described above may also be useful in various other applications, such as searching an image database for images containing a particular set of features; scanning envelopes for addresses; interpreting forms from a high-speed scanner; machine vision; and process-specific print image correction and verification. For further information on the general implementation described above, refer to U.S. patent application Ser. No. 07/993,218 pending, entitled "SIMD Architecture With Bus For Transferring Data To And From Processing Units," and U.S. patent application Ser. No. 07/993,256, pending, entitled "SIMD Architecture for Controlling Host Processor's Bus" both incorporated herein by reference.

E. Specific Implementation Features

Figure 9A:
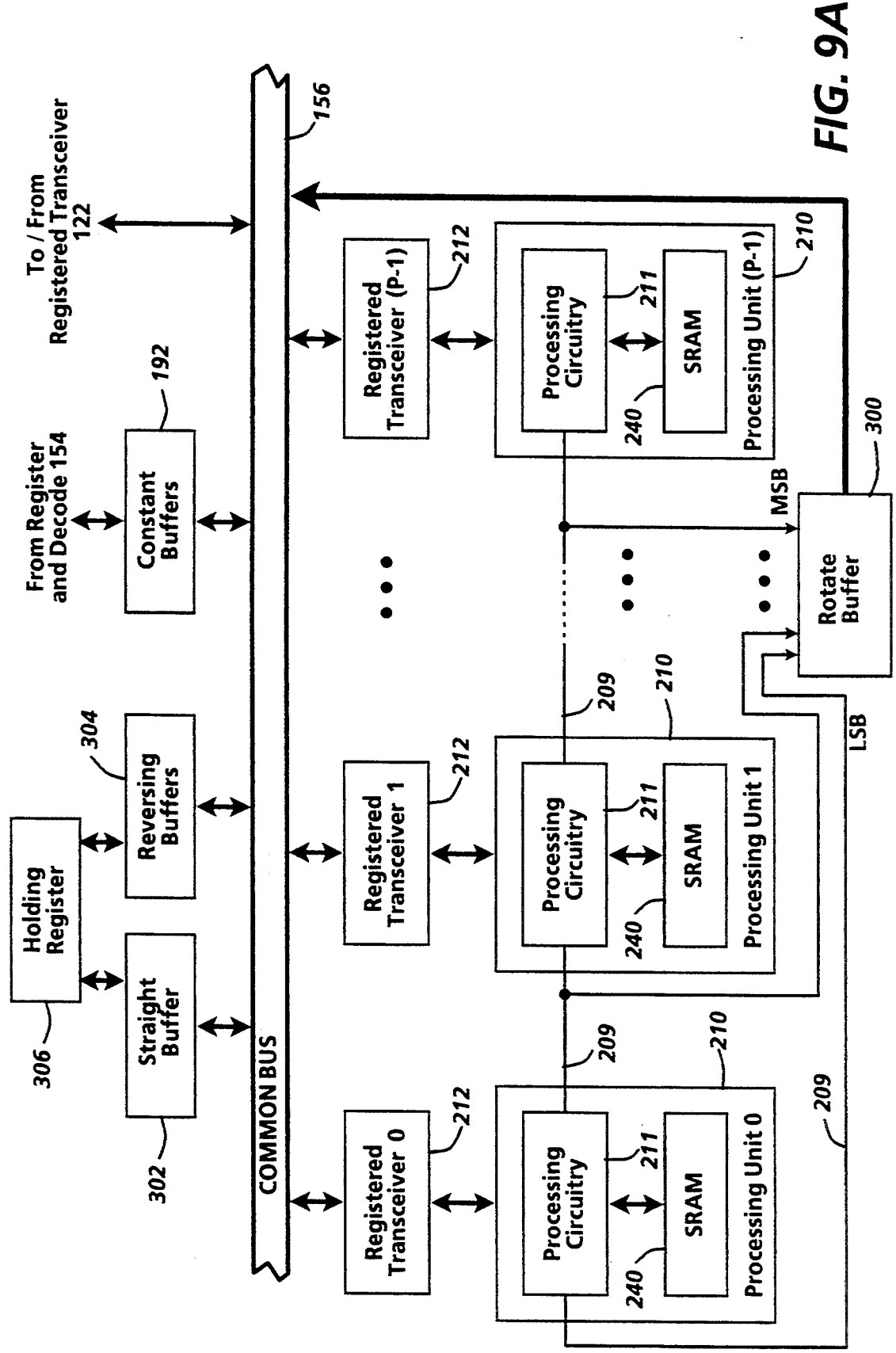
FIG. 9a is a schematic block diagram showing components of a SIMD parallel processor for performing rotation, including bus circuitry, source/destination circuitry for each processing unit, a transfer register, and rotation circuitry including a straight buffer, a reversing buffer and a rotate buffer.
Figure 9B:
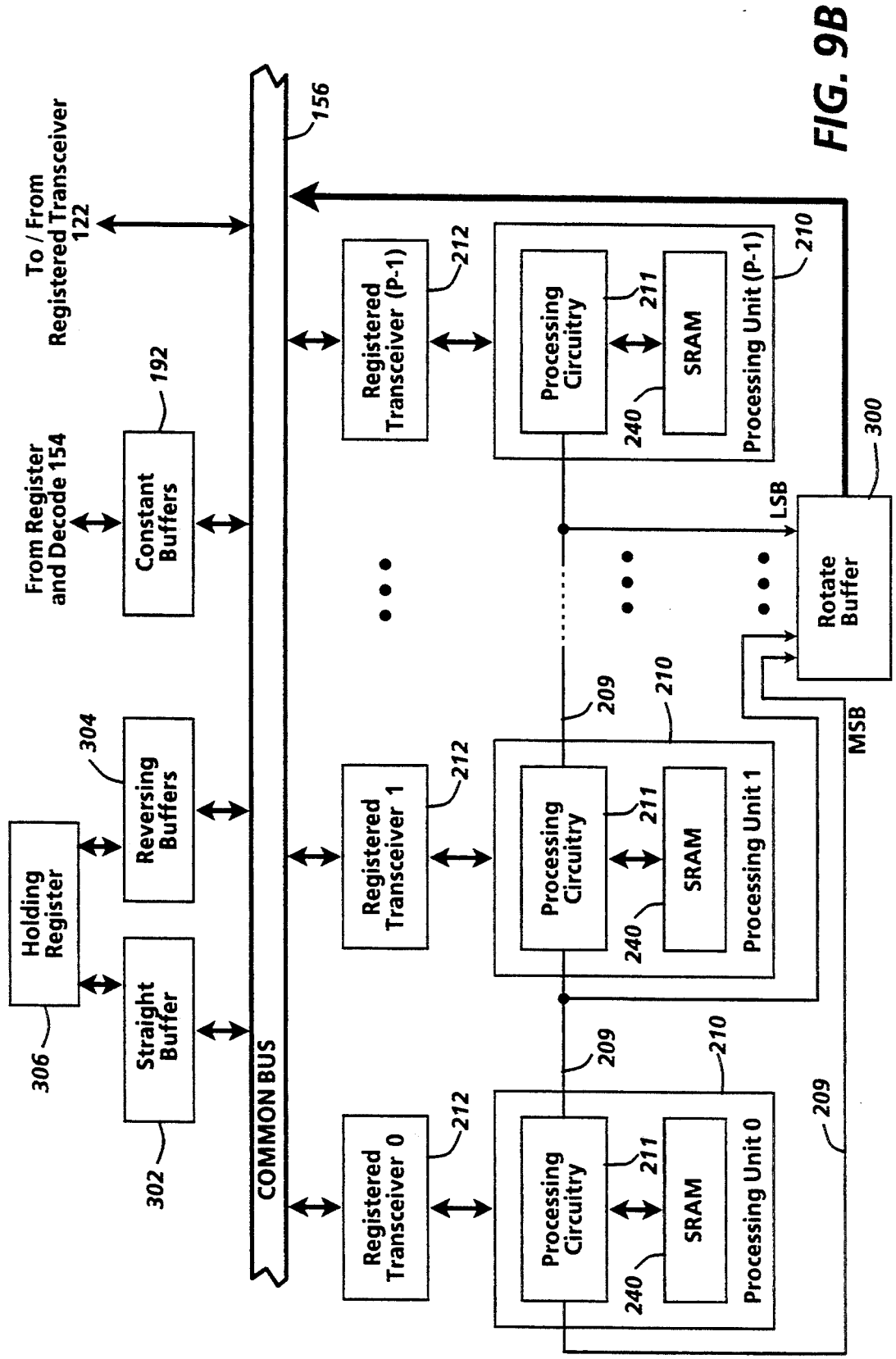
Figure 9C:
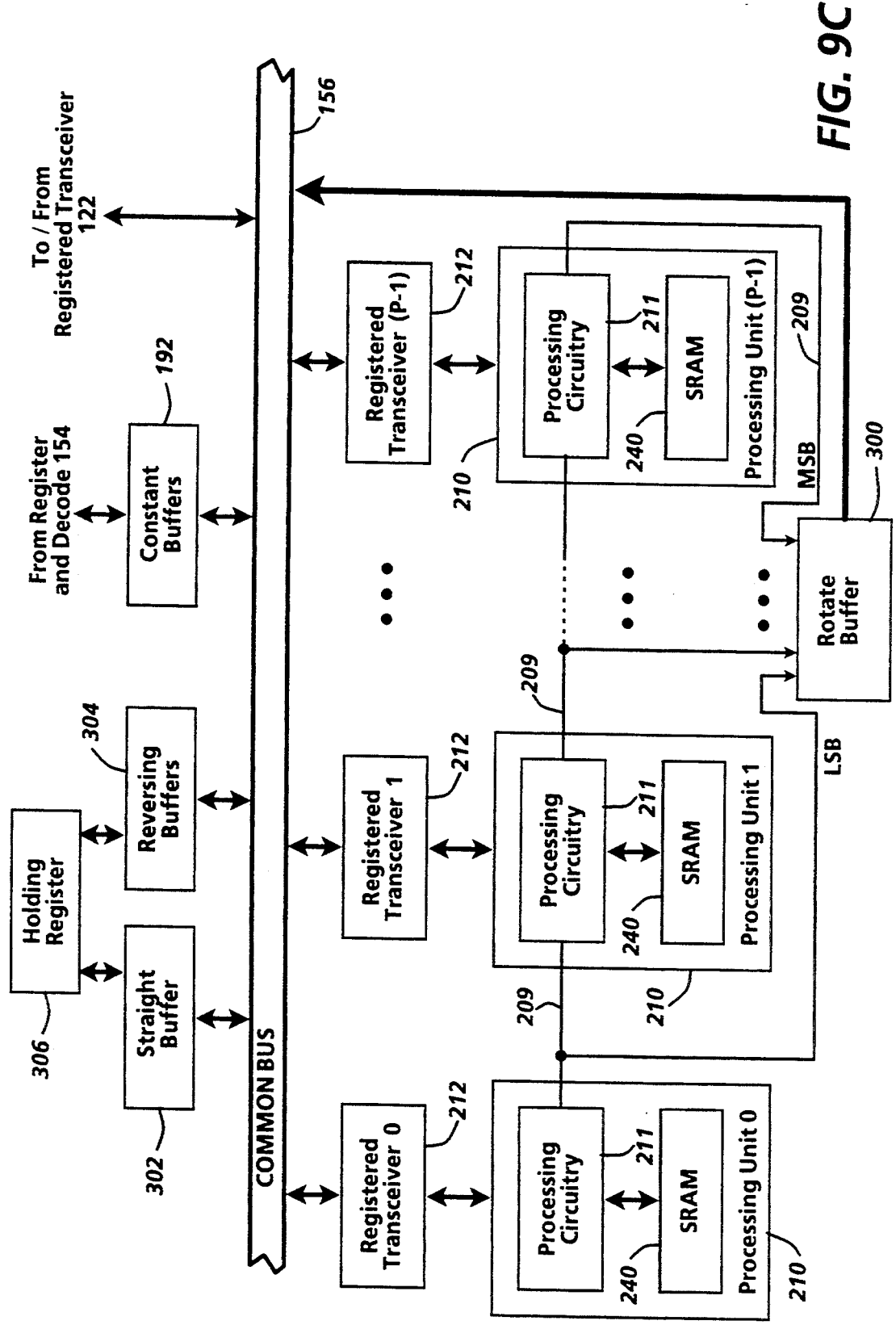
Figure 9D:
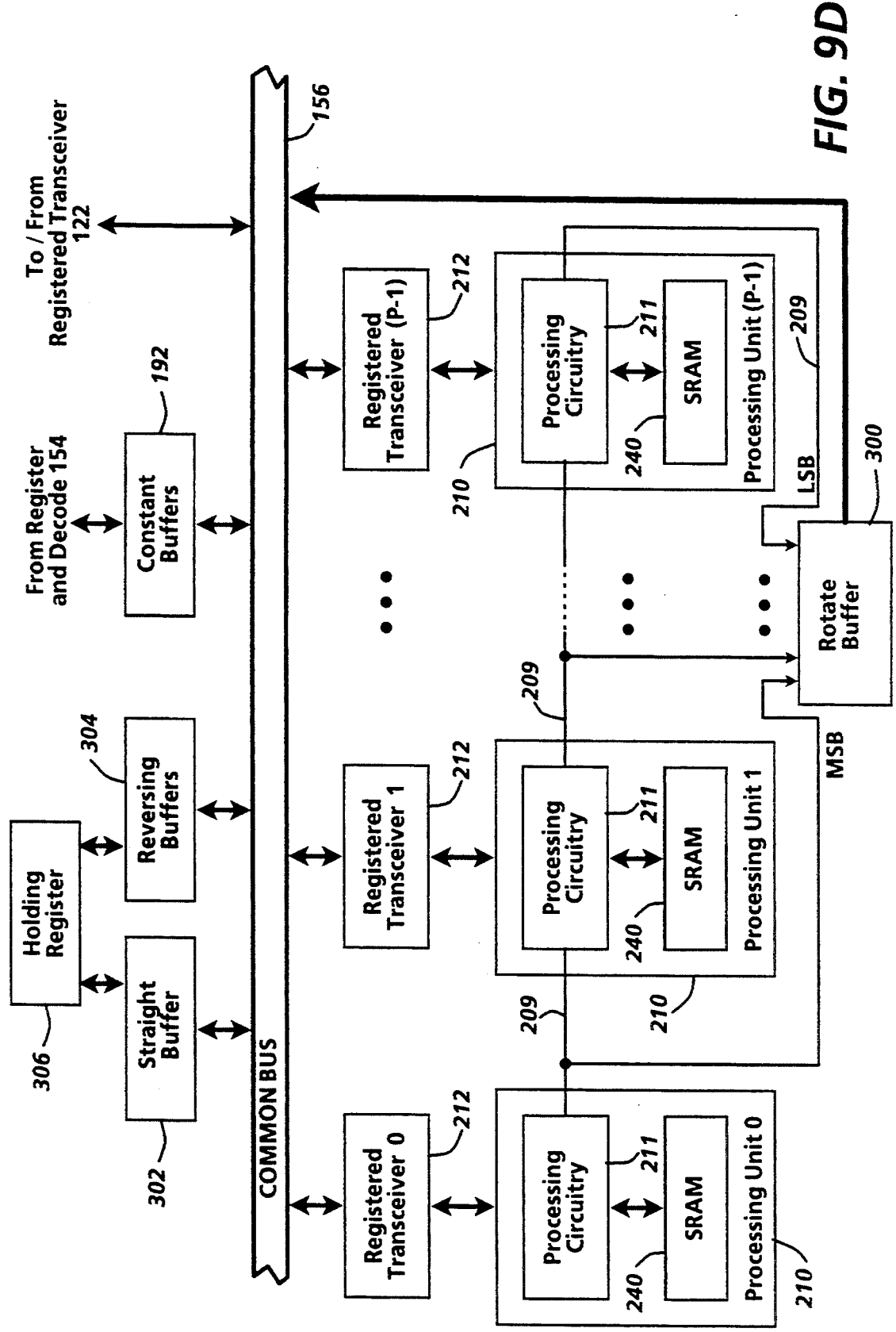

FIGS. 9a–9d, illustrate specific implementations of the schematic of FIG. 1, and show circuitry for rotating an image in a SIMD parallel processing unit. FIG. 9b shows circuitry representing another implementation of the circuitry of FIG. 9a. FIG. 9c shows circuitry representing another implementation of the circuitry of FIG. 9a. FIG. 9d shows circuitry representing another implementation of the circuitry of FIG. 9a.

FIG. 9a shows P processing units 210, identified as processing unit 0 through processing unit (P-1). Each processing unit includes processing circuitry 211 interfaced with SRAM 240. Processing circuitry 211 contains the equivalent parallel to serial units of FIG. 1. SRAM 240 is similar to the memory units of FIG. 1. Interconnecting circuitry includes a registered transceiver 212 for each processing unit, identified as registered transceiver 0 through registered transceiver (P-1). In general, the processing units and the respective registered transceivers can be implemented as described above in relation to FIG. 5.

The processing units 210 are interconnected in two ways. The internal shift registers of the processing units are connected into a one dimensional array, essentially creating a long shift register by serial transfer circuitry 209. The internal shift registers act as the parallel to serial units of FIG. 1. Also, bus circuitry 156 is connected to the registered transceivers 212 for each processing unit 210. Holding register 306 is connected to bus circuitry 156 through straight buffer 302 and reversing buffer 304 so that it can receive an item of data from bus circuitry 156, store the item of data, and then subsequently provide the stored item of data back to bus circuitry 156 for transmission to other components in the system.

Each processing unit's respective registered transceiver is connected to common bus 156 which can be a section of bus 30 of FIG. 1. Bus 156 can be implemented with conventional 32 bit bus circuitry, and register and decode 154 can provide signals to control data transfer on common bus 156 as described below.

Register and decode 154 can select any of several sources for common bus 156. The sources for common bus 156 include any of the registered transceivers 212, holding register 306 through either straight buffer 302 or reversing buffer 304, register and decode 154 through constant buffers 192, and rotate buffer 300. The inputs of rotate buffer 300 are connected to the single bit outputs of the processing units serial transfer circuitry 209. Rotate buffer 300 arranges these single bit outputs into a word for transfer to bus 156.

Holding register 306 can be used to store data from common bus 156 during one cycle and then to provide the stored data to common bus 156 for transmission to another component during a subsequent cycle. Holding register 306 could be implemented with a conventional 32 bit register. Straight buffer 302 and reversing buffer 304 could each be implemented with two 16 bit conventional bidirectional bus buffers. Rotate buffer 300 could be implemented with two 16 bit conventional bus buffers. Constant buffers 192 can include two conventional 16 bit buffers and can be used to provide a constant value to be used by the system.

There are four different ways in which the serial transfer circuitry 209 of a processing unit can be connected to rotate buffer 300 as illustrated by FIGS. 9a through 9d. The four configurations each are able to perform orthogonal transformations, however in slightly different ways.

Each processing unit has an internal shift register as shown in FIG. 6. The internal shift registers of adjacent processing units are connected by serial transfer circuitry 209. Before any shifting command has been issued to the processing units, the connection of serial transfer circuitry 209 on the left hand side of a processing unit represents the LSB of a word stored in the internal shift register of the processing unit. Likewise, the connection of serial transfer circuitry 209 on the right hand side of a processing unit represents the MSB of a word stored in the internal shift register of the processing unit. In the cases where serial transfer circuitry 209 is connected between two processing units, for example processing unit 0 and processing unit 1, there is control circuitry internal to the processing units so that only one value, either the LSB of processing unit 1 or the MSB of processing unit 0, is supplied by serial transfer circuitry 209 at a given time.

FIGS. 9a and 9b depict the LSBs of the shift registers as the inputs to rotate buffer 300. FIG. 9a shows processing unit 0 as the LSB input of rotate buffer 300 through processing unit (P-1) as the MSB input of rotate buffer 300. It is assumed that the bit order on the input of rotate buffer 300 is the same as the bit order on the output of rotate buffer 300 which is connected to bus 156. FIG. 9b shows processing unit (P-1) as the LSB input of rotate buffer 300 through processing unit 0 as the MSB input of rotate buffer 300. Serial transfer circuitry 209 between two processing units is controlled so that it is the LSB from the internal shift registers that is being supplied to rotate buffer 300 for transfer to bus 156.

FIGS. 9c and 9d depict the MSBs of the shift registers as the inputs to rotate buffer 300. FIG. 9c shows processing unit 0 as the LSB input of rotate buffer 300 through processing unit (P-1) as the MSB input of rotate buffer 300. FIG. 9d shows processing unit (P-1) as the LSB input of rotate buffer 300 through processing unit 0 as the MSB input of rotate buffer 300. Serial transfer circuitry 209 between two processing units is controlled so that it is the MSB from the internal shift registers that is being supplied to rotate buffer 300 for transfer to bus 156.

The circuitry shown in FIGS. 9a-d requires that the rows of each source data block be distributed among the array of processing units 10. Following is a description showing how the distribution of data among processing units is accomplished efficiently in the exemplary implementation.

Figure 10:
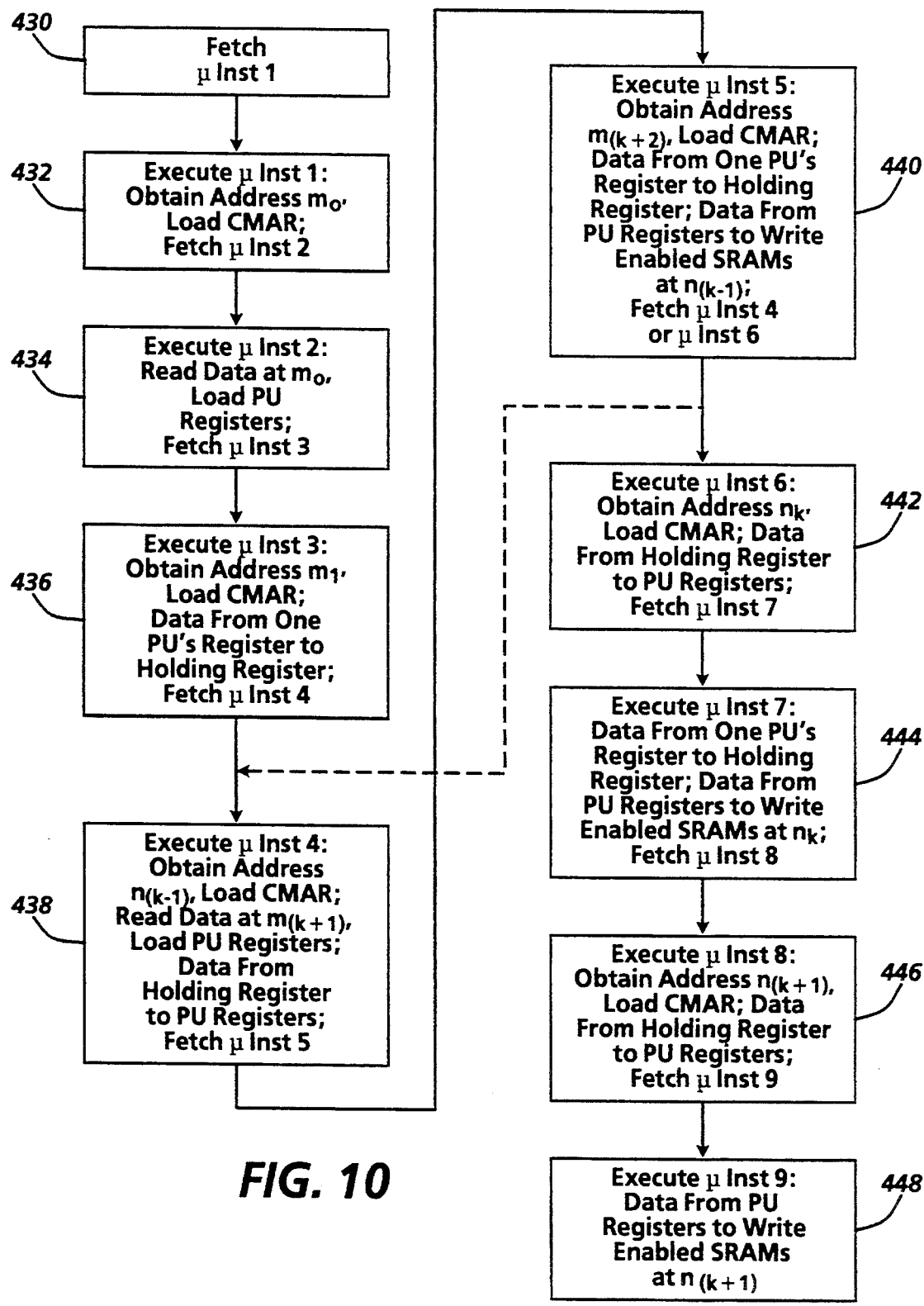
FIG. 10 is a flow chart showing clock cycles that transfer data in a pipelined manner from SRAM to SRAM using a holding register as in FIGS. 9a through 9d.

FIG. 10 shows a sequence of microinstructions that can operate the components of FIGS. 3, 4, 5 and 9a-9d. FIG. 10 illustrates a pipelined transfer of data using holding register 306 through either straight buffer 302 or reversing buffer 304 depending on which buffer is selected for a given orthogonal transformation. Therefore, in the following explanation, it is assumed that data being stored to holding register 306, or retrieved from holding register 306 goes through either straight buffer 302 or reversing buffer 304.

Clock cycle 430 in FIG. 10 includes an act that begins a pipelined transfer of data from between SRAMs by fetching a first microinstruction ($\mu$Inst1). $\mu$Inst1 includes an address processor instruction that includes an address processor opcode and an address processor register specifier. The instruction, when executed by address processor 170, produces an address $m_0$ that is loaded into CMAR 172.

Clock cycle 432 includes an act that executes $\mu$Inst1, providing the address processor instruction to address processor 170 and providing signals so that address $m_0$ is loaded into CMAR 172. Address processor 170 also executes the address processor instruction during clock cycle 432. Clock cycle 432 also includes an act that fetches a second microinstruction ($\mu$Inst2) whose address was loaded into MAR 152 during clock cycle 430. $\mu$Inst2 specifies operations that load a data unit from an addressed location in SRAM 240 for each processing unit into its registered transceiver 212, by specifying that SRAM 240 is a source for buses 242 and 244.

During clock cycle 434, address $m_0$ from CMAR 172 arrives at each processing unit's SRAM 240. Clock cycle 434 includes an act that executes $\mu$Inst2, providing signals that read enable each processing unit's SRAM 240 so that data units are read from the location at address $m_0$ and transferred through buses 242 and 244. This act also provides signals that load the data units into each processing unit's registered transceiver 212. Clock cycle 434 also includes an act that fetches a third microinstruction ($\mu$Inst3) whose address was loaded into MAR 152 during clock cycle 432.

Like $\mu$Inst1, $\mu$Inst3 includes an address processor instruction that produces an address $m_1$ that is loaded into CMAR 172. $\mu$Inst3 also specifies operations that load data units from one of registered transceivers 212 into holding register 306, by specifying the register of one of processing units 210 as a source for data and by specifying that holding register 306 should perform a load operation.

Clock cycle 436 includes an act that executes $\mu$Inst3, providing the address processor instruction to address processor 170 and providing signals so that address $m_1$ is loaded into CMAR 172 after address processor 170 executes the address processor instruction. The act of executing $\mu$Inst3 also provides signals that select one of the registered transceivers as a source and that store data from common bus 156 in holding register 306. Clock cycle 436 also includes an act that fetches a fourth microinstruction ($\mu$Inst4) whose address was loaded into MAR 152 during clock cycle 434.

Like $\mu$Inst2, $\mu$Inst4 specifies operations that load a data unit from an addressed location in SRAM 240 for each processing unit into its registered transceiver 212, by specifying that SRAM 240 is a source for buses 242 and 244. $\mu$Inst4 also includes an address processor instruction that produces an address $n_0$ that is loaded into CMAR 172. $\mu$Inst4 also specifies a transfer of data from holding register 306 to each of the registered transceivers 212 by specifying holding register 306 as a source for common bus 156.

The acts in clock cycles 430, 432, 434, and 436 set up a pipeline that can then be used by iterating the acts in clock cycles 438 and 440. Clock cycles 438 and 440 may be repeated K times, with each iteration being designated as the kth iteration.

Clock cycle 438 includes an act that executes $\mu$Inst4, providing the address processor instruction to address processor 170 and providing signals so that address $n_{(k-1)}$ is loaded into CMAR 172 after address processor 170 executes the address processor instruction. The act that executes $\mu$Inst4 also provides signals so that holding register 306 drives common bus 156 and registered transceivers 212 load data. Like the act in clock cycle 434, the act in clock cycle 438 provides signals that read enable each processing unit's SRAM 240 so that data units are read from the location at address $m_{(k+1)}$ and transferred through buses 242 and 244. This act also provides signals that load the data units into each processing unit's registered transceiver 212. Clock cycle 438 also includes an act that fetches a fifth microinstruction ($\mu$Inst5) whose address was loaded into MAR 152 during clock cycle 436 or, after the first iteration, during clock cycle 440 of the previous iteration.

Like $\mu$Inst3, $\mu$Inst5 includes an address processor instruction that produces an address $m_{(k+1)}$ that is loaded into CMAR 172. $\mu$Inst5 also specifies operations that load data units from one of registered transceivers 212 into holding register 306, by specifying the registered transceiver of one of processing units 210 as a source for data and by specifying that holding register 306 should perform a load operation. $\mu$Inst5 also specifies registered transceiver 212 as a source for buses 242 and 244 in each processing unit and also specifies in which processing units SRAM 240 should be written.

Clock cycle 440 includes an act that executes μInst5, providing the address processor instruction to address processor 170 and providing signals so that address $m_{(k+1)}$ is loaded into CMAR 172 after address processor 170 executes the address processor instruction. The act of executing μInst5 also provides signals that select one of registered transceivers 212 as a source and that store data from common bus 156 in holding register 306. The act of executing μInst5 also provides signals so that each processing unit's registered transceiver 212 drives buses 242 and 244 and provides write enable signals to the specified SRAMs. For example, both the upper and lower half of all SRAMs could be write enabled, or any single SRAM could be write enabled, for its upper half, its lower half, or both halves. As a result, data from registered transceiver 212 is written as specified. Clock cycle 440 also includes an act that either fetches μInst4 for the next iteration or that fetches a sixth microinstruction (μInst6), in either case using an address that was loaded into MAR 152 during clock cycle 438 of the current iteration.

Like μInst4, μInst6 includes an address processor instruction that produces an address $n_K$ that is loaded into CMAR 172. μInst6 also specifies a transfer of data from holding register 306 to each of registered transceivers 212 by specifying holding register 306 as a source for common bus 156.

The acts in clock cycles 442, 444, 446, and 448 then finish handling the pipeline of data resulting from the preceding steps, but without reading further data from the SRAMs.

Clock cycle 442 includes an act that executes μInst6, providing the address processor instruction to address processor 170 and providing signals so that address $n_K$ is loaded into CMAR 172 after address processor 170 executes the address processor instruction. The act that executes μInst6 also provides signals so that holding register 306 drives common bus 156 and registered transceivers 212 load data. Clock cycle 442 also includes an act that fetches a seventh microinstruction (μInst7) whose address was loaded into MAR 152 during the Kth iteration of clock cycle 440.

Like μInst5, μInst7 specifies operations that load data units from one of registered transceivers 212 into holding register 306, by specifying the registered transceiver of one of processing units 210 as a source and by specifying that holding register 306 should perform a load operation. μInst7 also specifies registered transceiver 212 as a source for buses 242 and 244 in each processing unit and also specifies in which processing units SRAM 240 should be written.

Clock cycle 444 includes an act that executes μInst7, providing signals that select one of registered transceivers 212 as a source and that store data from common bus 156 in holding register 306. The act of executing μInst7 also provides signals so that each processing unit's registered transceiver 212 drives buses 242 and 244 and provides write enable signals to the specified SRAMs. As a result, data from registered transceiver 212 is written as specified. Clock cycle 444 also includes an act that fetches an eighth microinstruction (μInst8), using an address that was loaded into MAR 152 during clock cycle 442.

Like μInst6, μInst8 includes an address processor instruction that produces an address $n_{(K+1)}$ that is loaded into CMAR 172. μInst8 also specifies a transfer of data from holding register 306 to each of registered transceivers 212 by specifying holding register 306 as a source for common bus 156.

Clock cycle 446 includes an act that executes μInst8, providing the address processor instruction to address processor 170 and providing signals so that address $n_{(K+1)}$ is loaded into CMAR 172 after address processor 170 executes the address processor instruction. The act that executes μInst8 also provides signals so that holding register 306 drives common bus 156 and registered transceivers 212 load data. Clock cycle 446 also includes an act that fetches a ninth microinstruction (μInst9) whose address was loaded into MAR 152 during clock cycle 444. Like μInst7, μInst9 specifies registered transceiver 212 as a source for buses 242 and 244 in each processing unit and also specifies in which processing units SRAM 240 should be written.

Clock cycle 448 includes an act that executes μInst9, providing signals so that each processing unit's registered transceiver 212 drives buses 242 and 244 and provides write enable signals to the specified SRAMs. As a result, data from registered transceiver 212 is written as specified. This completes the pipelined transfer of data.

Reference is made to U.S. patent application Ser. No. 07/993,218, pending, entitled "SIMD Architecture With Bus For Transferring Data To And From Processing Units," for more specific information on microinstructions relating to transferring data between processing units, and the transfer buffer.

ORTHOGONAL ROTATION

One way to perform rotations, is to divide an image file into squares or rectangles, rotate each square or rectangle, then places the results accordingly in a destination image file. Following is an illustration of how the system of the present invention accomplishes rotation. Note that rotation angles discussed below reference clockwise rotation.

Figure 11A:
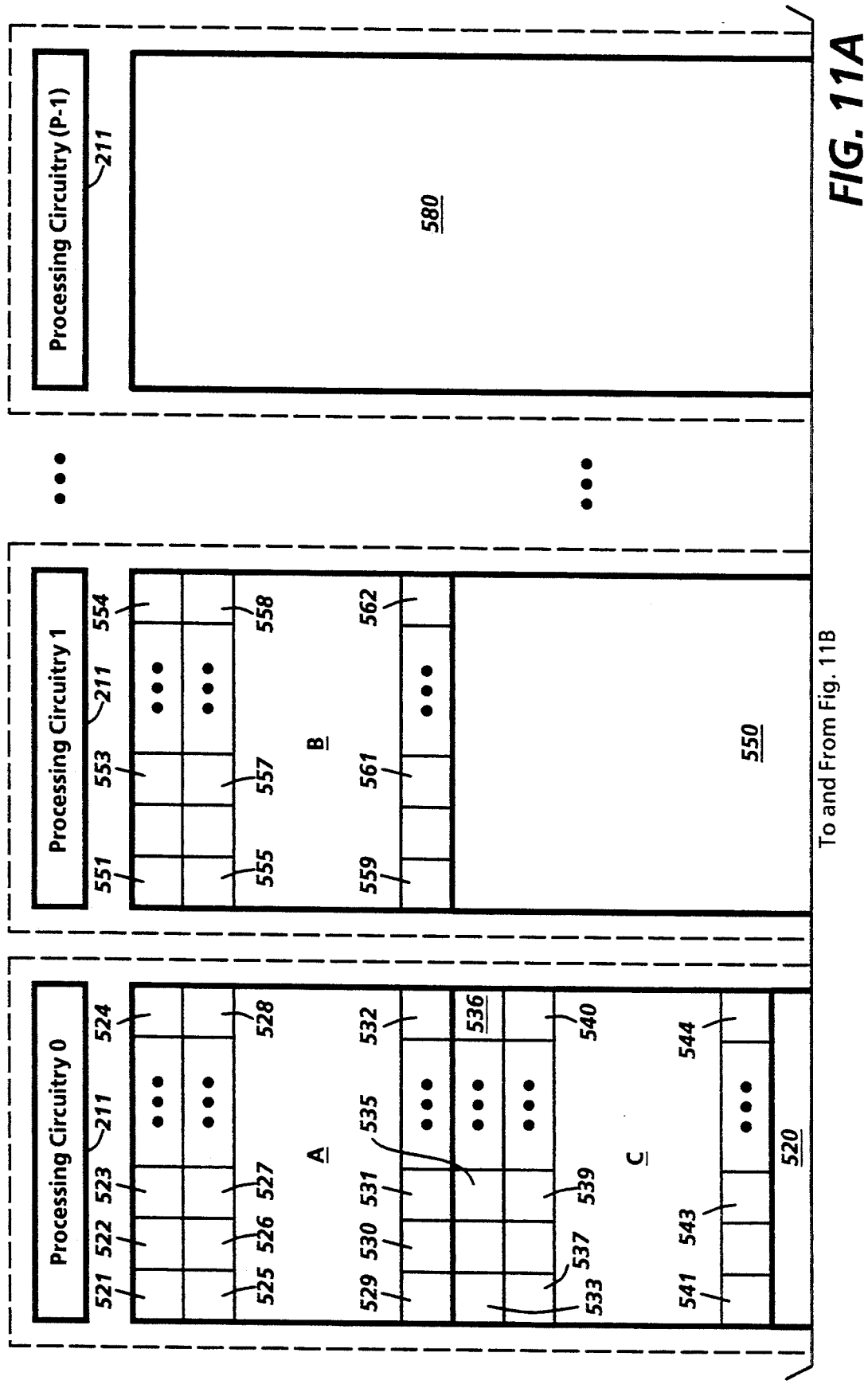
FIGS. 11a and 11b are schematics representation showing a one dimensional SIMD array with associated memory space.
Figure 11B:
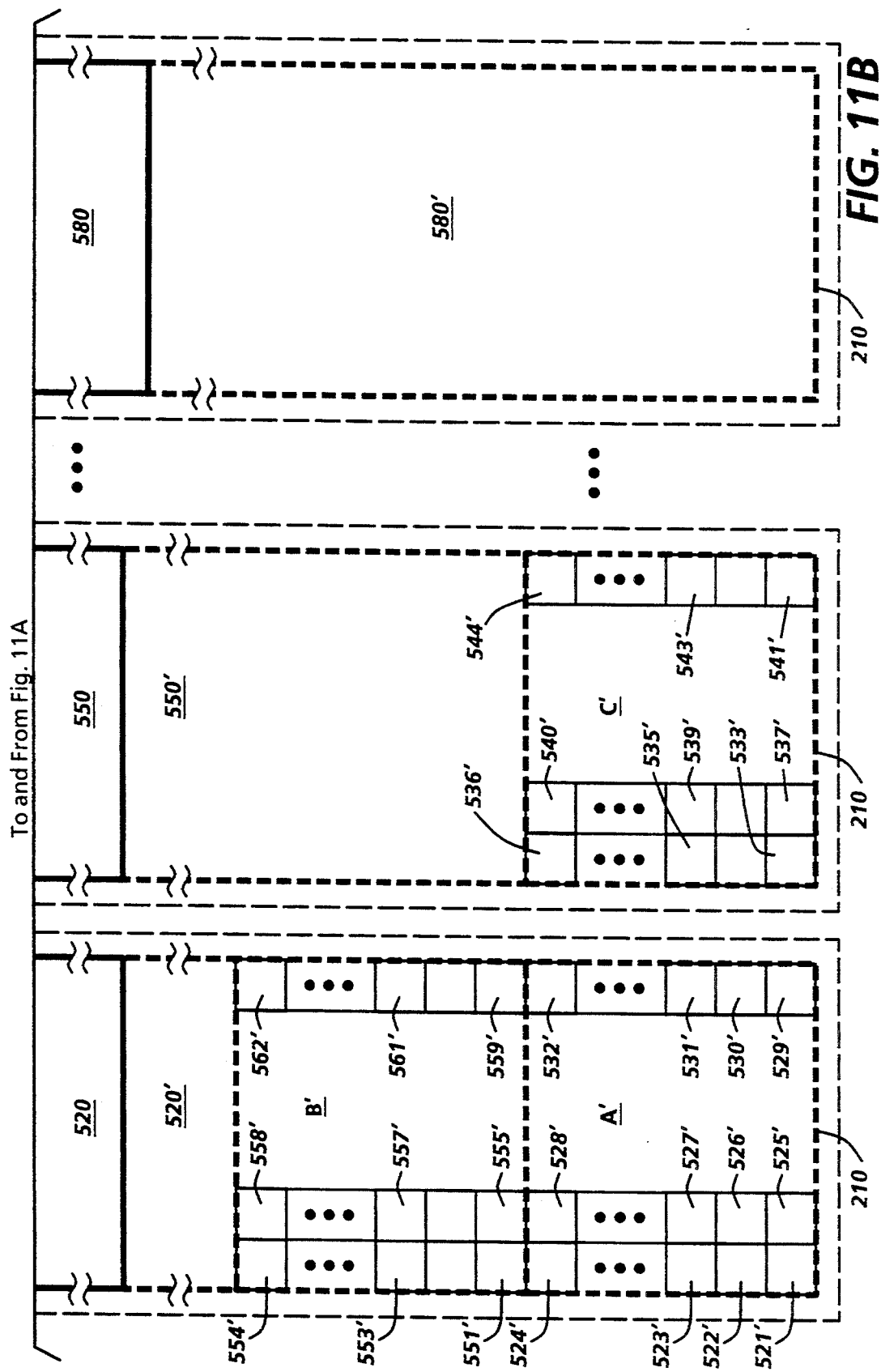
Figure 12A:
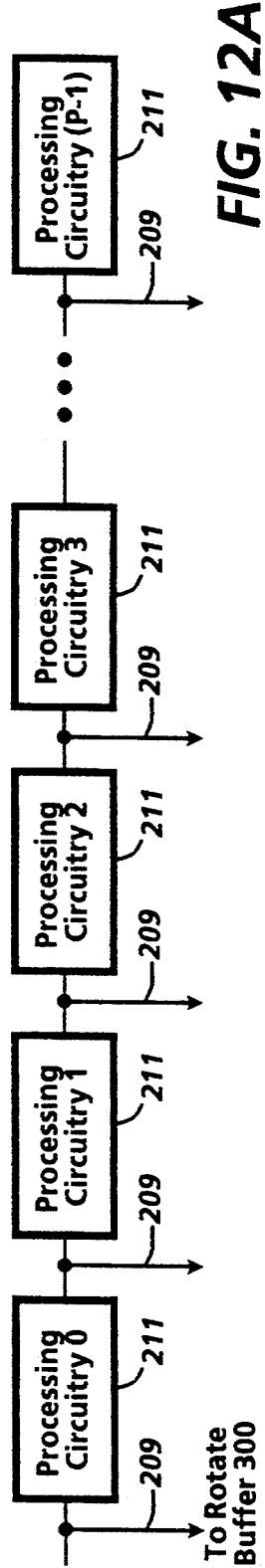
FIG. 12a is a schematic representation showing a one dimensional SIMD array positioned horizontally.
Figure 12B:
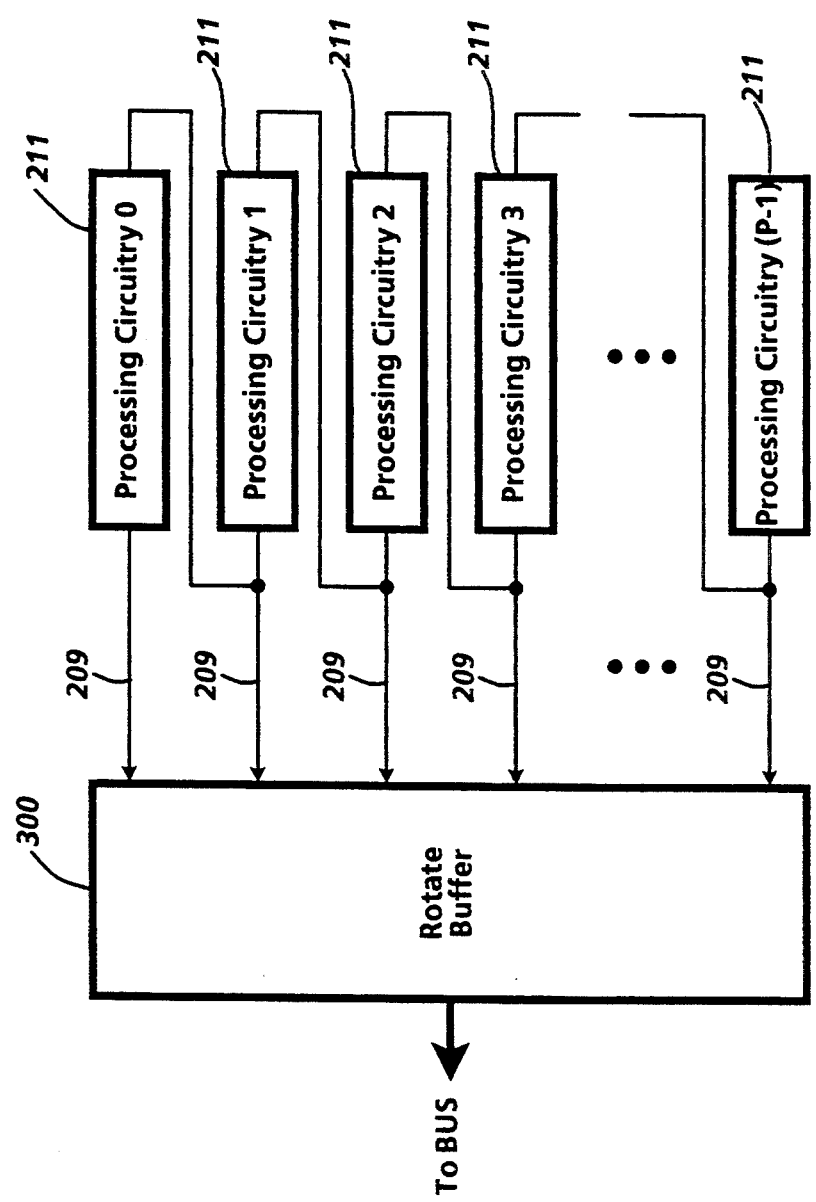
FIG. 12b is a schematic representation showing the one dimensional SIMD array of FIG. 12a positioned vertically and connected to a rotate buffer.

FIGS. 11, 12, and 13, illustrate a procedure for performing orthogonal transformations by the system configuration of FIG. 9a. FIG. 11 illustrates a one dimensional array of processing units. FIG. 12a shows the processing circuitry of the processing units of FIG. 11 arranged horizontally. FIG. 12b shows the elements of FIG. 12a positioned vertically and connected to a rotate buffer. FIG. 13 shows all eight possible orthogonal rotations.

FIG. 11 illustrates a row of P processing units, where each processing unit 210 has associated processing circuitry 211 and associated memory space. Memory space 520/520' is a memory space associated with the processing circuitry 0 and is divided into source memory space 520 and destination memory space 520', shown by the dashed line borders. Memory space 520 contains a stored image or partial image designated as the source. Memory space 520' denoted by the dashed lines, represents a memory space equal in size to memory space 520 and will be used to store a destination image or partial destination image. Memory space 520/520' is n bits wide where n is the number of bits in a processing unit. For explanation purposes, n is equal to 32 bits, where each bit represents a pixel in an image. Also, assume the number of processing units, P, is equal to 32.

In a similar manner, memory space 550/550' is a memory space associated with the processing circuitry 1 and is divided into source memory space 550 and destination memory space 550', shown by the dashed line borders. Memory space 550 contains a stored image or partial image designated as the source. Memory space 550' denoted by the dashed lines, represents a memory space equal in size to memory space 550 and will be used to store a destination image or partial destination image. Memory space 550/550' is also n bits wide where n is the number of bits in a processing unit.

Finally, memory space 580/580' is a memory space associated with the processing circuitry (P-1) and is divided into source memory space 580 and destination memory space 580', shown by the dashed line borders. Memory space 580 contains a stored image or partial image designated as the source. Memory space 580' denoted by the dashed lines, represents a memory space equal in size to memory space 580 and will be used to store a destination image or partial destination image. Memory space 580/580' is also n bits wide where n is the number of bits in a processing unit.

To perform a rotation on binary image data where the number of bits per processor n equals the number of processing units P, the task involves three steps: 1) breaking the image into n×n squares; 2) rotating each square by converting rows into columns; and, 3) placing each rotated square into its proper position in the destination image memory. The remainder of the task deals with the specific rotation of squares. The rotation processes will be discussed in general, then in detail, below with reference to FIGS. 11, 12a, and 12b.

FIG. 12a represents processing circuitry 211 of P processing units connected to form a one dimensional array. In this example, there are 32 processors and each processor has an internal shift register able to accommodate 32 bits. In general, the first step in rotating an n×n square is to transfer the first 32 bits from each of the first 32 rows of pixels from memory 520 associated with processing circuity 0. Then, distribute the 32 bit segments among processing circuitry 0 through (P-1). Next, these row segments can be visualized as a column of 32 bit segments as shown in FIG. 12b. The particular configuration shown in FIG. 12b has serial transfer circuitry 209 connected to the left side or the LSB of the internal shift register in the processors. Next, for each bit in the registers, simultaneously shift one bit left in all the registers then store the result in the appropriate destination memory 520' associated with processing circuitry 0. Each group of pixels shifted simultaneously out of the registers represent a column in the destination image. The result of shifting and storing 32 times accomplishes the rotation of a 32×32 square segment of the image. A detailed explanations involving bit manipulation is described below with reference to FIG. 11.

FIG. 11 further illustrates the details of a bit manipulation of an image segmented into 32×32 bit squares which are then rotated by 270 degrees. In keeping with the process for rotating a 32×32 bit section, 32 one bit pixels 521, 522, 523 through 524 from data block designated by the letter A are transferred from memory 520 into the internal shift register of processing circuitry 0. Using the pipelined transfer method described above, the next 32 bit line of associated memory 520, pixels 525, 526, 527, though 528 are transferred to the internal shift register of processing circuitry 1. Transferring of data from the memory of one processor to the memory of another processor has been discussed in detail above with reference to FIGS. 10. Continuing, the first 32 lines of data in block A are transferred and distributed to the processing circuitry of each of the 32 processors. The last row in block A, pixels 529, 530, 531 through 532 are transferred to processing circuitry (P-1) which is part of the thirty-second processor.

Once each of the 32 bit lines, having 32 pixels, are distributed among the processors, a rotation of the 32×32 block can be accomplished. In order to rotate the block by 270 degrees, the leftmost column of each of the source blocks must become the bottom row of the rotated block. Each of the first bits in each of the 32 processors is shifted out onto lines serial transfer circuitry 209 creating a 32 bit word input to rotate buffer 300. Using rotate buffer 300, those 32 bits are transferred to the destination data block A' using common bus 156 as described above, with processing circuitry 0 supplying the LSB through processing circuitry (P-1) supplying the MSB to the inputs of rotate buffer 300 and thus to bus 156. Pixels 521', 525' through 529' in block A' as shown are now the rotated representations of pixels 521, 525 through 529.

Next, the internal shift registers in all of the processing circuitry elements receive a microinstruction to shift left one bit, placing the second pixel from the lines of block A, pixels 522, 526, through 530, onto serial transfer circuitry 209. Again, rotate buffer 300 is used to place these 32 bits onto common bus 156 to be stored in block A' as pixels 522', 526', through 530'. This shifting and storing operation is requested for each of the 32 bits stored in each processing circuitry element. In the final operation for rotating the data in block A, the final pixels of the lines of block A, pixels 524, 528, through 532 are shifted through serial transfer circuitry 209 to rotate buffer 300 for transfer and subsequent storage as pixels 524', 528' through 532'. Rotation on the 32×32 bit data block A has now been rotated and stored in data block A' of destination memory 520'.

Proceeding to the right, the next 32 bit segment of the first 32 scanlines of image stored in associated memory 550, denoted as data block B, is to be rotated and placed in destination memory 520'. Pixels 551, 553 through 554 are transferred from memory 550 to the internal shift register of processing circuitry 0. The second scanline of block B, pixels 555, 557 through 558 are transferred directly into the internal shift register of processing circuitry 1. Each of the 32 bit words of the 32 line block are in turn transferred to corresponding processing circuitry, with the last line of block B, pixels 559, 561 through 562 being transferred to processing circuitry (P-1).

Similar to the rotation process of data block A, the internal shift registers of each of the processing circuitry elements receive a series of microinstruction to shift left one bit, and then through the use of the rotate buffer, store the resulting data into the appropriate memory denoted as block B'. This shifting and storing operation is requested for each of the 32 bits stored in each shift register until all pixels in the 32×32 bit block have been stored. These pixels are stored in destination memory 520' associated with processing circuitry 0 as pixels 551' through 562'. Each of the remaining 32 bit segments of the first 32 scanlines of the image are processed in turn until all of the data in block B is rotated and stored in block B' in memory 520'.

Moving past the first 32 lines of the image and back to the leftmost column, the next 32 scanlines of image stored in memory 520 will be rotated in 32×32 bit blocks. The first 32 bits of the first scanline in memory data block C has pixels 533 through 536. Pixels 533 through 536 are transferred from memory 520 and stored in the internal shift register of processing circuitry 0. The first 32 bits of the second scanline in segment C are transferred and stored in the internal shift register of processing circuitry 1. Each of the 32 bit scanline segments in data block C are transferred and stored in the internal shift registers of corresponding processing circuitry elements, through the last line of the block C including pixels 541 through 544, which are stored in the internal shift register of processing circuitry (P-1). This 32×32 bit segment is rotated as described above and stored as segment C' in destination memory 550' as pixels 533' through 544'. As can be appreciated, each 32×32 block of the image stored in memories 520, 550, through 580 is rotated in turn, as described above, and stored in destination memory 520', 550', through 580'.

To facilitate all eight orthogonal transformations shown in FIG. 13, operations other than the ones described above must be implemented. FIG. 12b shows the processing circuitry of the processing units in the array stacked on top of each other so the array of processors is P processors tall, each n bits wide where P=n. This forms one n×n square to be rotated. The processors are numbered from 0 to P-1 starting at the top. The rotate buffer 300 connects the left side of this n×n square to bus 156, which can in turn be connected to any of the processing units in the system. In the above explanation it was assumed that rotate buffer 300 is wired so the bit from the topmost processor connects to the leftmost bit, or LSB, of rotate buffer 300 and the bottom processor connects to rightmost bit, or MSB, of rotate buffer 300, as shown in the FIG. 9a configurations.

Assume the rows of the source square of image pixels are designated S0 through S(n-1), S0 being on top. The rows can be distributed among the processing circuitry such that processing circuitry 0 gets row S0, processing circuitry 1 gets row S1 and so on. Or, they could be distributed so that processing circuitry 0 gets row S(n-1), processing circuitry 1 gets row S(n-2) through processing circuitry (P-1) gets row S0. Similarly, as the columns are rotated, the results can be written from the bottom of the destination square to the top or the top to the bottom.

Essentially, a "Mirror X" operation can result by manipulating the loading and storing of information in both the source and destination images.

Before continuing to explain how to perform the orthogonal transformation, several terms need to be defined in terms of system configuration. If the lines of the processors making up a square are loaded into the processors from top to bottom, or processing circuitry 0 to processing circuitry (P-1), it can be said that they are loaded in "Source Normal" order. If the processors are loaded from bottom to top, or from processing circuitry (P-1) to processing circuitry 0, they are loaded in "Source Mirror" order. Similarly, if the first (leftmost) column of the source square goes into the bottom row of the destination square, the destination image is stored in "Destination Normal" order. If the first (leftmost) column of the source square is stored in the top row of the destination square, the destination image is stored in "Destination Mirror" order. In Destination Normal order, the destination squares are written from the bottom of the image towards the top and in Destination Mirror order the squares are written from the top of the image towards the bottom. In both cases, completed columns of destination squares are placed in the destination image from left to right.

Referring to the eight orthogonal transformations shown in FIG. 13, using the system configuration of FIGS. 9a, following is a summary of the procedures used to perform each of the eight transformations: 1) Identity—No action required; 2) 270 Degree Rotation (as illustrated above with reference to FIG. 11)—use rotate buffer, load processing circuitry in source normal order and store rotated columns in destination normal order; 3) Mirror Y—use reversing buffer to reverse each image line in place; 4) Transpose Major—use rotate buffer, load processing circuitry in source normal order and store rotated columns in destination mirror order; 5) 90 Degree Rotation—use rotate buffer, load processing circuitry in source mirror order, and store rotated columns in destination mirror order; 6) 180 Degree Rotation—use reversing buffer to reverse each image line, start from top of source image and bottom of destination image, working down through source and up through destination; 7) Transpose Minor—uses rotate buffer, load processing circuitry in source mirror order, store rotated columns in destination normal order; and 8) Mirror X—rotate buffer not used, load source image line 0 and store into destination image line n-1 (bottom line of entire destination image), load source image line 1, store into destination image line n-2 and so on.

As described in relation to FIGS. 9a through 9d, there are four possible ways the rotate buffer could be connected, either to the left or right side of the processing units and for each side, the uppermost column bit could be connected to the leftmost LSB or rightmost MSB bit of the rotate buffer. If the rotate buffer is connected to the right side of the square as in FIGS. 9c and 9d, then all "Destination Normal" references above are changed to into "Destination Mirror" and vice versa. If the topmost bit of the rotate buffer is connected to the rightmost bit of the rotate buffer as in FIGS. 9b and 9d, change "Source Normal" into "Source Mirror" and vice versa.

There may be times when the number of processors, or processing units, P, does not equal the number of bits per processor n. In these cases, rotation using the system described above is still possible with slight modification in the processes used. First, assume the number of bits per processor, n, and the number of processors, P, are both powers of 2. If P is less than n, divide each processor into sections such that the number of bits in each section equals P. The internal shift registers will need to be divided at these boundaries also. The rotation will then be performed on a P×P bit square block instead of a n×n bit square block. Once the rows from the P×P bit block are read from the memory associated with a particular processor, they are distributed to the corresponding associated memory the other processors using the transfer techniques described above in relation to bus 156. From a hardware standpoint, rotate buffer 300 would have to be changed so that there are $s^2$ rotate buffers (where s=n/P), connecting every combination of shift registers at section boundaries to selections in bus 156.

For example, assume there are 16 processors, each having internal registers that are 32 bits wide. In this case, P=16 and n=32 so s=2. Each processor would be divided into upper and lower 16 bit halves. There would be $2^2$, or 4 rotate buffers. Two of the rotate buffers would connect the shift register outputs of the upper halves of the processors to the upper and lower halves of bus 156. The other two rotate buffers would connect the shift registers of the lower halves of the processors to the upper and lower halves of bus 156.

In the case where P is greater than n, only the first n processors do the rotation. The rows of each square would be sent to those n processors. The rotate buffer would connect the outputs of the shift registers of the first n processors to bus 156. The rotation would continue by rotating n×n squares until the entire image was rotated.

F. Miscellaneous

The invention has been described in relation to implementations in which processing units are interconnected in a one-dimensional array. The invention might also be implemented with a SIMD parallel processor in which the processing units are connected into a two- or three-dimensional array or into any other suitable arrangement.

The invention has been described in relation to implementations in which processing units include single port memory circuitry. The invention might also be implemented with dual port memory circuitry.

The invention has been described in relation to implementations in which a 32 bit bus interconnects 32 bit registers and in which each processing unit includes two 16 bit microprocessors and a 32 bit SRAM. The invention might also be implemented in numerous other ways with components having different widths. For example, each processing unit might include a 16 bit SRAM for each microprocessor or each processing unit might include a single 32 bit microprocessor. Alternatively, the bus might be a 16 bit or 64 bit bus, and other components could be chosen accordingly. Similarly, the control store, described as implemented with 128 bit microinstructions, might also be implemented with microinstructions of other lengths, such as 64 bit encoded microinstructions. Further the invention might be implemented with a dedicated control store chip.

The invention has been described in relation to implementations that operate on binary data defining images, but might also be implemented to operate on gray scale data or other color data with the addition of additional rotations buffers, specifically one rotation buffer for each bit/pixel.

The invention has been described in relation to implementations that include readily available discrete components. The invention might also be implemented with custom VLSI components, and similarly with custom memory components.

The invention has been described in relation to implementations in which each processing unit includes SRAM, but the invention might also be implemented with dynamic RAM (DRAM).

The invention has been described in relation to implementations that using the Q register of the processing chips. The invention might also be implemented using other registers within the processing chip.

While the invention has been described with reference to the structures disclosed, it is not confined to the details set forth, but is intended to cover such modifications or changes as may come within the scope of the following claims:

I claim:

1. A processor, comprising:
    a bus; the bus transferring two or more bits in parallel, the transferred bits forming an item of data having a most significant bit and a least significant bit;
    two or more memory units; each memory unit being connected to provide data in parallel to the bus and to receive data in parallel from the bus; each memory unit further being connected to receive address signals indicating addresses and select signals indicating selection of the memory unit as a source or destination for transfer of data;
    two or more parallel to serial units; each parallel to serial unit being connected for receiving data in parallel from the bus, each parallel to serial unit converting data received in parallel to serial data; each of the parallel to serial units providing serial data in parallel with the other parallel to serial units;
    a rotation buffer; the rotation buffer being connected to receive the serial data provided in parallel by the parallel to serial units; the rotation buffer further being connected to provide the serial data to the bus;
    reversing circuitry connected to receive items of data from the bus; the reversing circuitry reversing an item of data received from the bus to obtain a reversed item of data with a most significant bit equal to the least significant bit of the received item of data and with a least significant bit equal to the most significant bit of the received item of data; the reversing circuitry further being connected to provide the reversed item of data to the bus; and
    control circuitry for providing control signals to the memory units, the parallel to serial units, and the rotation buffer; the control signals causing transfer of data between the memory units, the parallel to serial units, and the rotation buffer, the control circuitry further comprising:
        address circuitry for providing address signals concurrently to all of the memory units so that all the memory units receive the same address signals in parallel; and selection circuitry for providing select signals to select a source and a destination for a transfer of data over the bus; the selection circuitry being connected to provide select signals selecting any of the memory units or the rotation buffer as a source; the selection circuitry being connected to provide select signals selecting any of the memory units or any of the parallel to serial units as a destination.

2. The processor of claim 1 in which the processor comprises two or more processing units; each of said two or more processing units including one of the memory units and one of the parallel to serial units.

3. The processor of claim 2 in which each of said two or more processing units further comprises:
    interconnecting circuitry connected for providing data from the processing unit's memory unit to the bus and connected for providing data from the bus to either the processing unit's memory unit or the processing unit's parallel to serial unit.

4. A processor, comprising:
    a bus;
    two or more memory units; each memory unit being connected to provide data in parallel to the bus and to receive data in parallel from the bus; each memory unit further being connected to receive address signals indicating addresses and select signals indicating selection of the memory unit as a source or destination for transfer of data;
    two or more parallel to serial units, each parallel to serial unit being connected for receiving data in parallel from the bus, each parallel to serial unit converting data received in parallel to serial data;

each of the parallel to serial units providing serial data in parallel with the other parallel to serial units; each parallel to serial unit having a least significant bit and a most significant bit;

a rotation buffer; the rotation buffer being connected to receive the serial data provided in parallel by the parallel to serial units; the rotation buffer further being connected to provide the serial data to the bus; the rotation buffer having, for each parallel to serial unit, an input connection for receiving serial data from the parallel to serial unit;

for each parallel to serial unit, a serial line connecting the parallel to serial unit to the rotation buffer's input connection for the parallel to serial unit; each parallel to serial unit's serial line being connected to receive one of the unit's least significant bit and most significant bit; and control circuitry for providing control signals to the memory units, the parallel to serial units, and the rotation buffer; the control signals causing transfer of data between the memory units, the parallel to serial units, and the rotation buffer, the control circuitry further comprising:

address circuitry for providing address signals concurrently to all of the memory units so that all the memory units receive the same address signals in parallel; and selection circuitry for providing select signals to select a source and a destination for a transfer of data over the bus; the selection circuitry being connected to provide select signals selecting any of the memory units or the rotation buffer as a source; the selection circuitry being connected to provide select signals selecting any of the memory units or any of the parallel to serial units as a destination.

5. The processor of claim 4 in which each parallel to serial unit's serial line is connected to receive the unit's least significant bit.

6. The processor of claim 4 in which each parallel to serial unit's serial line is connected to receive the unit's most significant bit.

7. A processor, comprising:
a bus for transferring M bit items of data in parallel, where M is an integer greater than one;
M processing units; each of said M processing units comprising:
a memory unit for storing M bit items of data;
a parallel to serial unit for receiving M bit items of data in parallel and for converting M bit items of data received in parallel to serial data; and
interconnecting circuitry connected for providing M bit items of data from the processing unit's memory unit to the bus and connected for providing M bit items of data from the bus to either the processing unit's memory unit or the processing unit's parallel to serial unit;
a rotation buffer; the rotation buffer being connected to receive the serial data provided by the parallel to serial units of the processing units in parallel; the rotation buffer further being connected to provide the serial data received in parallel to the bus; and
control circuitry for providing control signals to the processing units and the rotation buffer; the control signals causing transfer of data between the memory units, the parallel to serial units, and the rotation buffer so that data from the memory units is rotated;

the control circuitry providing control signals so that M acts of transferring data are performed; each of said M acts of transferring data including:
providing an item of data from the memory unit of a source processing unit to the source processing unit's interconnecting circuitry; providing the item of data from the source processing unit's interconnecting circuitry to the bus;
receiving the item of data from the bus at the interconnecting circuitry of a destination processing unit; and
providing the item of data from the destination processing unit's interconnecting circuitry to the destination processing unit's parallel to serial unit;
each of said M processing units being the source processing unit for exactly one of the M acts of transferring data and being the destination processing unit for exactly one of the M acts of transferring data; the source processing unit and the destination processing unit of each of the M acts of transferring data being two different processing units;
the control circuitry further providing control signals so that M acts of storing data are performed; each of said M acts of storing data including:
providing a bit of data from each processing unit's parallel to serial unit to the rotation buffer to form a rotated item of data;
providing the rotated item of data from the rotation buffer to the bus;
receiving the rotated item of data from the bus at the interconnecting circuitry of a destination processing unit; and
providing the rotated item of data from the destination processing unit's interconnecting circuitry to the destination processing unit's memory unit;
each of said M processing units being the destination processing unit for exactly one of the M acts of storing data; the destination processing units of the M acts of storing data being selected so that data from said M processing units is rotated.

8. A processor according to claim 7 further comprising:
a reversing buffer, the reversing buffer having two or more inputs and outputs, the inputs and outputs being connected to the interconnecting circuitry, the reversing buffer receiving data signals on the inputs and providing a bit reversal of the received data signals on the outputs.

9. A processor according to claim 8 wherein the processor is a SIMD processor.

10. A processor according to claim 9 wherein the parallel to serial units are shift registers.

11. A processor according to claim 10 wherein the memory units are SRAM.

12. A processor according to claim 7 wherein the processor is a SIMD processor.

13. A processor according to claim 7 wherein the parallel to serial units are shift registers.

14. A processor according to claim 7 wherein the memory units are SRAM.

15. A method of operating a processor that includes:
a bus for transferring M bit items of data in parallel, where M is an integer greater than one;
M processing units; each of said M processing units comprising:
a memory unit for storing M bit items of data;

a parallel to serial unit for receiving M bit items of data in parallel and for converting M bit items of data received in parallel to serial data; and interconnecting circuitry connected for providing M bit items of data from the processing unit's memory unit to the bus and connected for providing M bit items of data from the bus to either the processing unit's memory unit or the processing unit's parallel to serial unit;

a rotation buffer; the rotation buffer being connected to receive the serial data provided by the parallel to serial units of the processing units in parallel; the rotation buffer further being connected to provide the serial data received in parallel to the bus;

the method comprising:

M acts of transferring data; each of said M acts of transferring data comprising:

providing an item of data from the memory unit of a source processing unit to the source processing unit's interconnecting circuitry;

providing the item of data from the source processing unit's interconnecting circuitry to the bus;

receiving the item of data from the bus at the interconnecting circuitry of a destination processing unit; and providing the item of data from the destination processing unit's interconnecting circuitry to the destination processing unit's parallel to serial unit;

each of said M processing units being the source processing unit for exactly one of the M acts of transferring data and being the destination processing unit for exactly one of the M acts of transferring data; the source processing unit and the destination processing unit of each of the M acts of transferring data being two different processing units; and M acts of storing data; each of said M acts of storing data comprising:

providing a bit of data from each processing unit's parallel to serial unit to the rotation buffer to form a rotated item of data;

providing the rotated item of data from the rotation buffer to the bus;

receiving the rotated item of data from the bus at the interconnecting circuitry of a destination processing unit; and providing the rotated item of data from the destination processing unit's interconnecting circuitry to the destination processing unit's memory unit;

each of said M processing units being the destination processing unit for exactly one of the M acts of storing data; the destination processing units of the M acts of storing data being selected so that the method rotates data from the M processing units.

16. A method of operating a processor according to claim 15 further including:

a reversing buffer, the reversing buffer having two or more inputs and outputs, the inputs and outputs being connected to the interconnecting circuitry, the reversing buffer receiving data signals on the inputs and providing a bit reversal of the received data signals on the outputs.

17. A method of operating a processor according to claim 16 wherein the processor is a SIMD processor.

18. A method of operating a processor according to claim 17 wherein the parallel to serial units are shift registers.

19. A method of operating a processor according to claim 18 wherein the memory units are SRAM.

20. A method of operating a processor according to claim 15 wherein the processor is a SIMD processor.

21. A method of operating a processor according to claim 15 wherein the parallel to serial units are shift registers.

22. A method of operating a processor according to claim 15 wherein the memory units are SRAM.

* * * * *